United States Patent
Noro et al.

(10) Patent No.: US 9,199,621 B2
(45) Date of Patent: Dec. 1, 2015

(54) VEHICLE BRAKE DEVICE

(71) Applicant: ADVICS CO., LTD., Kariya (JP)

(72) Inventors: Kazutaka Noro, Kariya (JP); Yasunori Sakata, Toyota (JP); Yoshinori Suzuki, Handa (JP); Satoshi Ishida, Chiryu (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 189 days.

(21) Appl. No.: 13/684,339

(22) Filed: Nov. 23, 2012

(65) Prior Publication Data

US 2013/0127240 A1 May 23, 2013

(30) Foreign Application Priority Data

Nov. 23, 2011 (JP) ................. 2011-255641

(51) Int. Cl.
  *B60T 13/58* (2006.01)
  *B60T 8/40* (2006.01)
  *B60T 17/22* (2006.01)
  *B60T 13/14* (2006.01)

(52) U.S. Cl.
  CPC .............. *B60T 13/58* (2013.01); *B60T 8/4077* (2013.01); *B60T 13/147* (2013.01); *B60T 17/221* (2013.01); *B60T 13/145* (2013.01)

(58) Field of Classification Search
  CPC ....... B60T 15/16; B60T 15/048; B60T 8/441; B60T 4/446; B60T 8/4081; B60T 13/66; B60T 13/145; B60T 13/686; B60T 17/18; B60T 13/58
  USPC ............... 303/9, 14, 15, 122.11, 113.4, 114.1
  See application file for complete search history.

(56) References Cited

U.S. PATENT DOCUMENTS

| | | | | |
|---|---|---|---|---|
| 3,877,756 A | * | 4/1975 | Inada et al. | 303/114.1 |
| 4,641,894 A | * | 2/1987 | Belart | 303/114.1 |
| 4,729,609 A | * | 3/1988 | Seibert et al. | 303/114.1 |
| 6,412,882 B1 | * | 7/2002 | Isono et al. | 303/114.1 |
| 2001/0054842 A1 | * | 12/2001 | Tanaka et al. | 303/113.1 |
| 2011/0241417 A1 | * | 10/2011 | Miyazaki et al. | 303/2 |
| 2013/0127241 A1 | * | 5/2013 | Sakata | 303/14 |
| 2015/0015061 A1 | * | 1/2015 | Masuda et al. | 303/10 |

FOREIGN PATENT DOCUMENTS

JP 2008-087617 A 4/2008

* cited by examiner

*Primary Examiner* — Thomas Irvin
(74) *Attorney, Agent, or Firm* — Buchanan Ingersoll & Rooney PC

(57) ABSTRACT

A vehicle brake device is provided with a master piston which is driven to generate a master cylinder pressure. The device includes a pressure accumulation portion that accumulates the brake fluid under pressure; a servo pressure generation portion that is configured to be able to generate the servo pressure using the brake fluid in the pressure accumulation portion regardless of the operation of the brake operation member; brake fluid consumption correlative value detection means for detecting a brake fluid consumption correlative value relating to a consumption of the brake fluid in the pressure accumulation portion; and failure detection means for driving the master pistons only by the servo pressure using the servo pressure generation portion in a state where the brake operation member is not operated, and detecting a failure of a master system, based on a brake fluid consumption correlative value detected by the brake fluid consumption correlative value detection means at that time.

6 Claims, 13 Drawing Sheets

Fig. 5
(a)
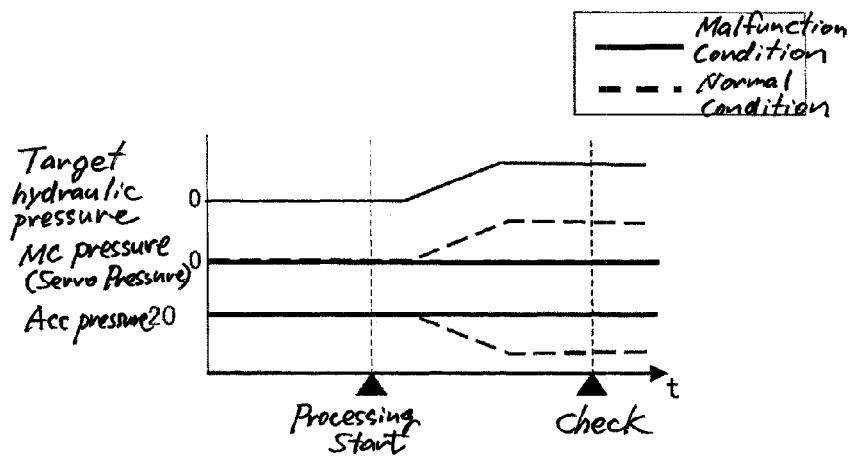
(b)
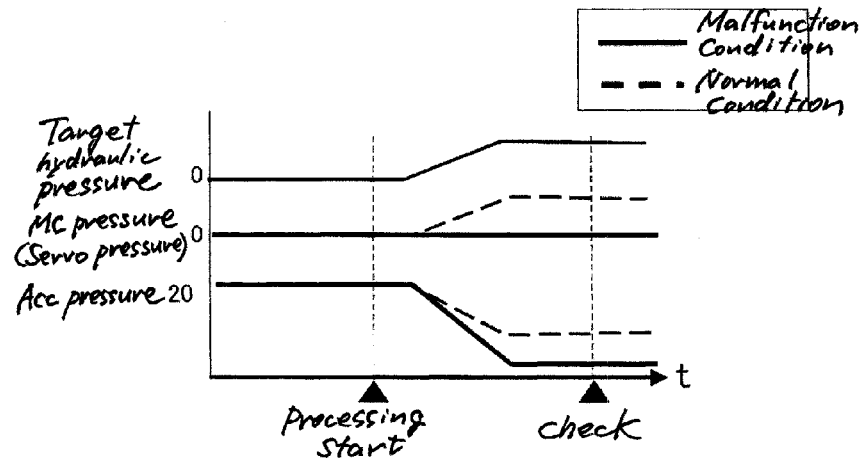
(c)
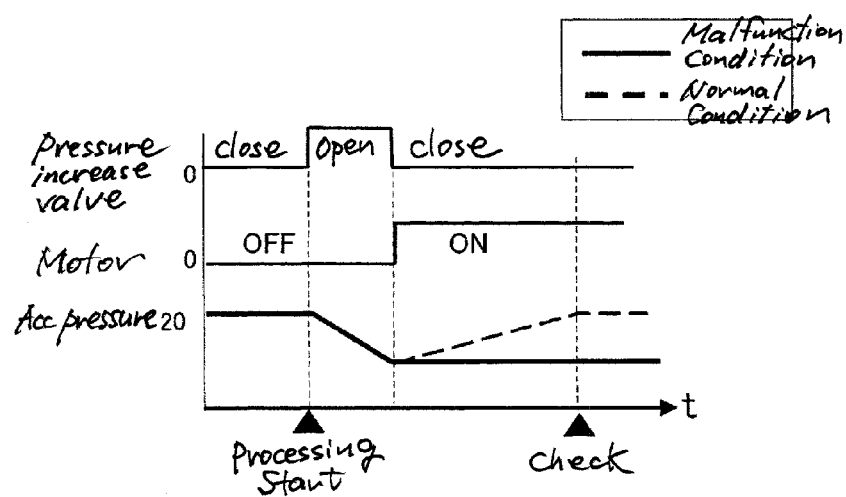

Fig. 6
(a)
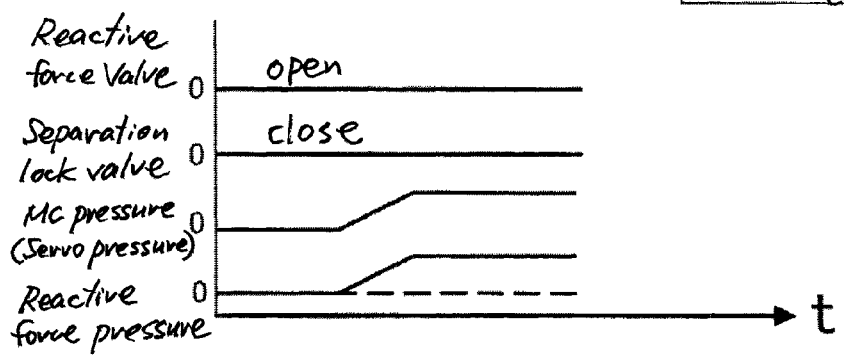
(b)
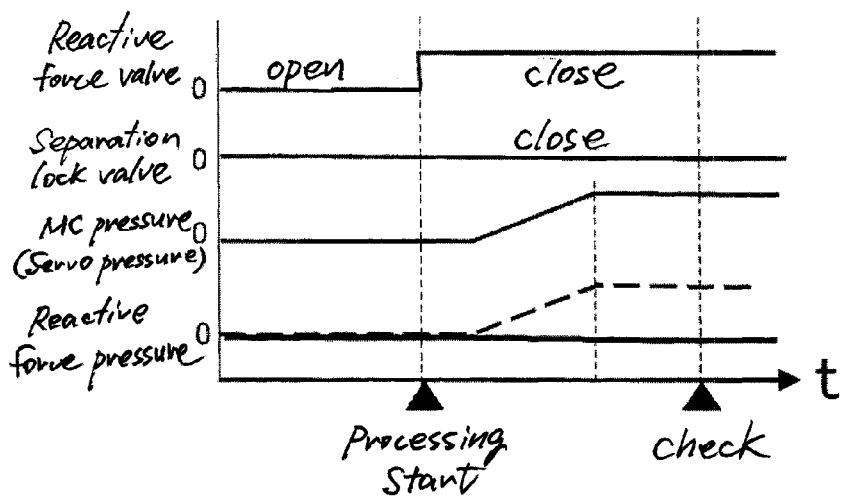

Fig. 7
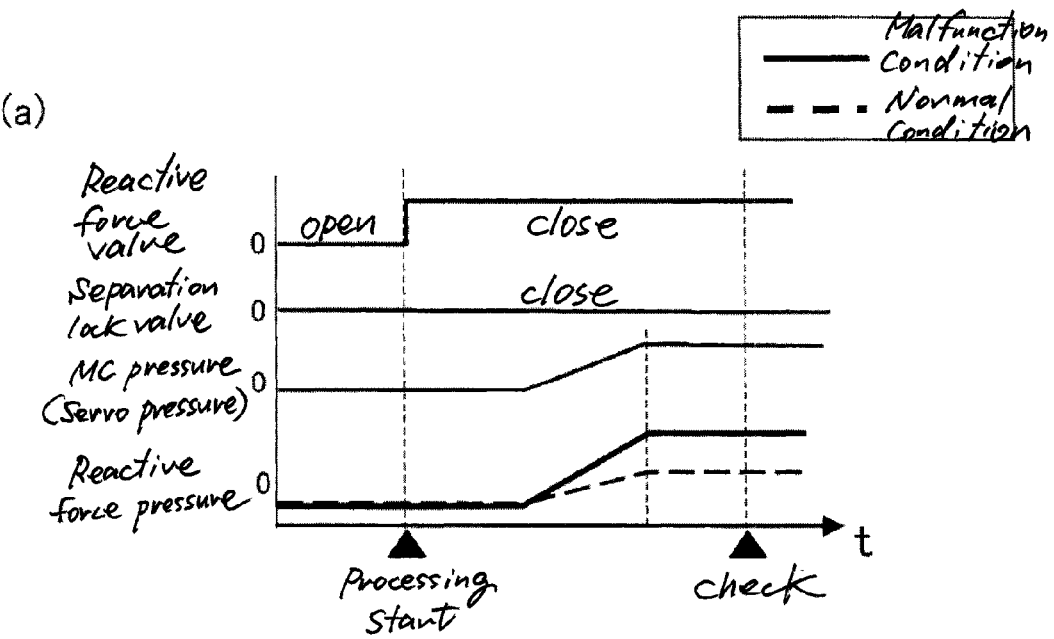
(a)
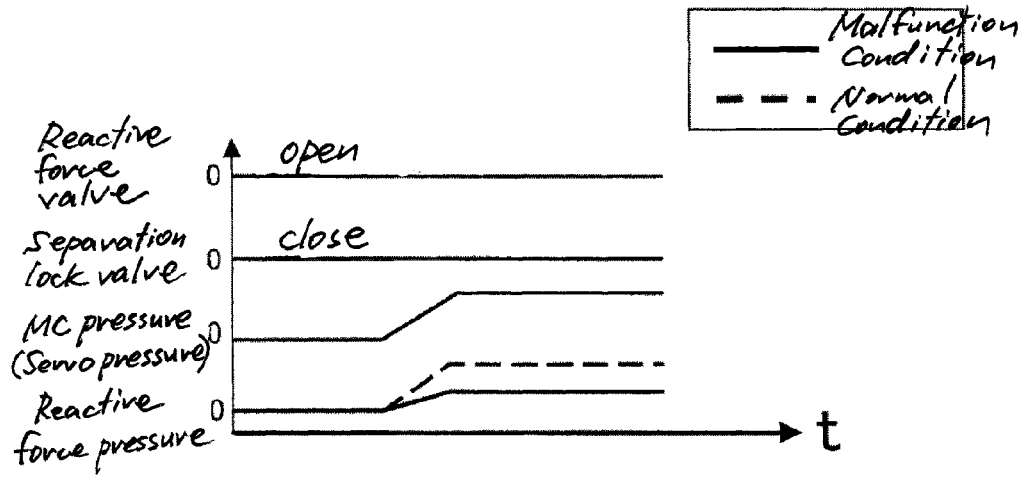
(b)

Fig. 9
(a)
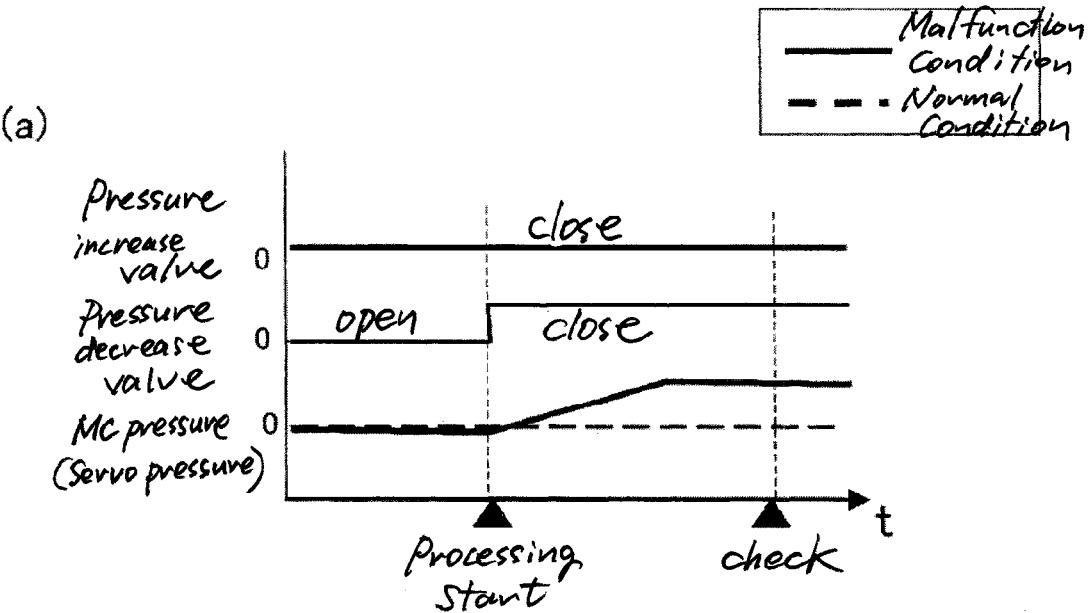
(b)
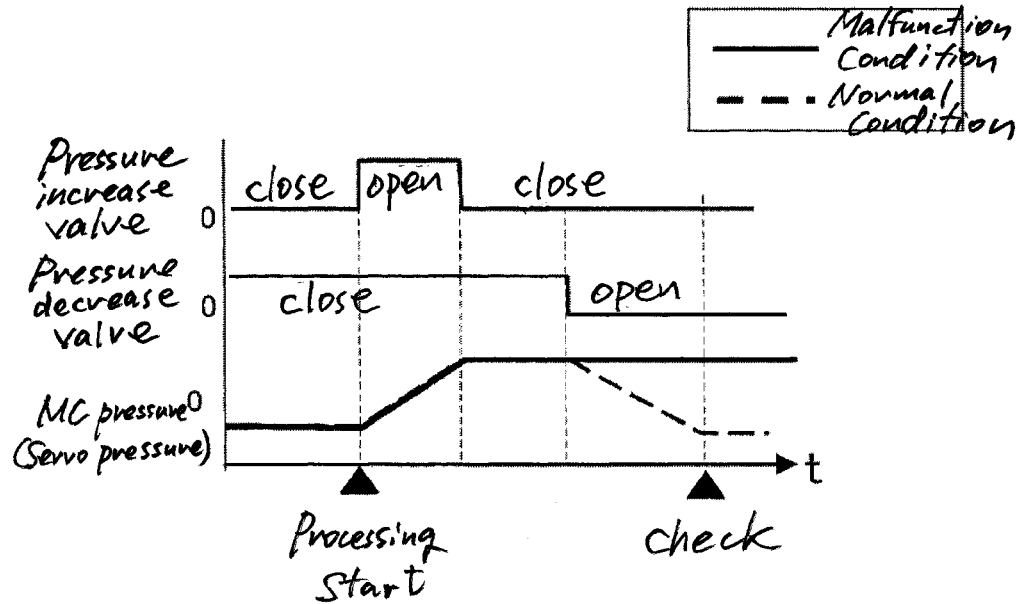

VEHICLE BRAKE DEVICE

TECHNOLOGICAL FIELD

The present invention relates to a vehicle brake device that controls braking force applied to a vehicle depending on an amount of brake operation by a driver.

BACKGROUND DISCUSSION

As an example of a vehicle brake device configured to control a braking force applied to a vehicle depending on an amount of brake operation due to a driver, for example, a vehicle brake device disclosed in JP-A-2008-87617 (Patent Document 1) has been known. In the vehicle brake device, an input piston and a pressing piston are held at a separated state with a predetermined interval (a stroke), and thus the braking force based on a control oil pressure generated by an accumulator and a linear valve is applied to a wheel cylinder depending on the movement of the input piston. In the vehicle brake device disclosed in Patent Document 1, it is possible to detect a malfunction of a master cut valve by stepping a brake pedal.

However, the prior device disclosed in Patent Document 1 has a configuration in which, if the brake pedal is not stepped, the malfunction of the master cut valve cannot be detected, and thus the failure of the master system cannot be detected. In this configuration, the malfunction cannot be detected without the cooperation of a driver.

SUMMARY

The present invention has been made in view of such circumstances, and an object thereof is to provide a vehicle brake device capable of detecting the failure of the master system even when a brake operation member is not operated.

According to the present invention, there is provided a vehicle brake device in which master piston is driven by any one of a force corresponding to an operation force of a brake operation member and a force corresponding to servo pressure in a servo chamber to generate master cylinder pressure, the device including a pressure accumulation portion that accumulates the brake fluid under pressure; a servo pressure generation portion that is configured to be able to generate the servo pressure using the brake fluid in the pressure accumulation portion regardless of the operation of the brake operation member; brake fluid consumption correlative value detection means for detecting a the brake fluid consumption correlative value relating to a consumption of the brake fluid in the pressure accumulation portion; and failure detection means for driving the master pistons only by the servo pressure using the servo pressure generation portion in a state where the brake operation member is not operated, and detecting a failure of a master system, based on a brake fluid consumption correlative value detected by the brake fluid consumption correlative value detection means at that time.

In the present invention, the expression "a force corresponding to an operation force of a brake operation member" is a force (including a direct force and an indirect force due to oil pressure of a reactive force chamber) that is added to the master piston, mainly by a force when a driver steps the brake operation member, and is a concept that includes a force added to the master piston by the servo pressure when the servo pressure is thereby generated mechanically and structurally.

BRIEF DESCRIPTION OF THE DRAWING FIGURES

FIG. 5 is an explanatory diagram that illustrates a flow of processing related to the abnormality detection control;

FIG. 6 is an explanatory diagram that illustrates a flow of processing related to the abnormality detection control;

FIG. 7 is an explanatory diagram that illustrates a flow of processing related to the abnormality detection control;

FIG. 9 is an explanatory diagram that illustrates a flow of processing related to the abnormality detection control;

DETAILED DESCRIPTION

Hereinafter, the present embodiment will be described based on the drawings. In addition, the respective drawings are conceptual diagrams, and the detailed structure sizes thereof are not regulated.

Figure 1:
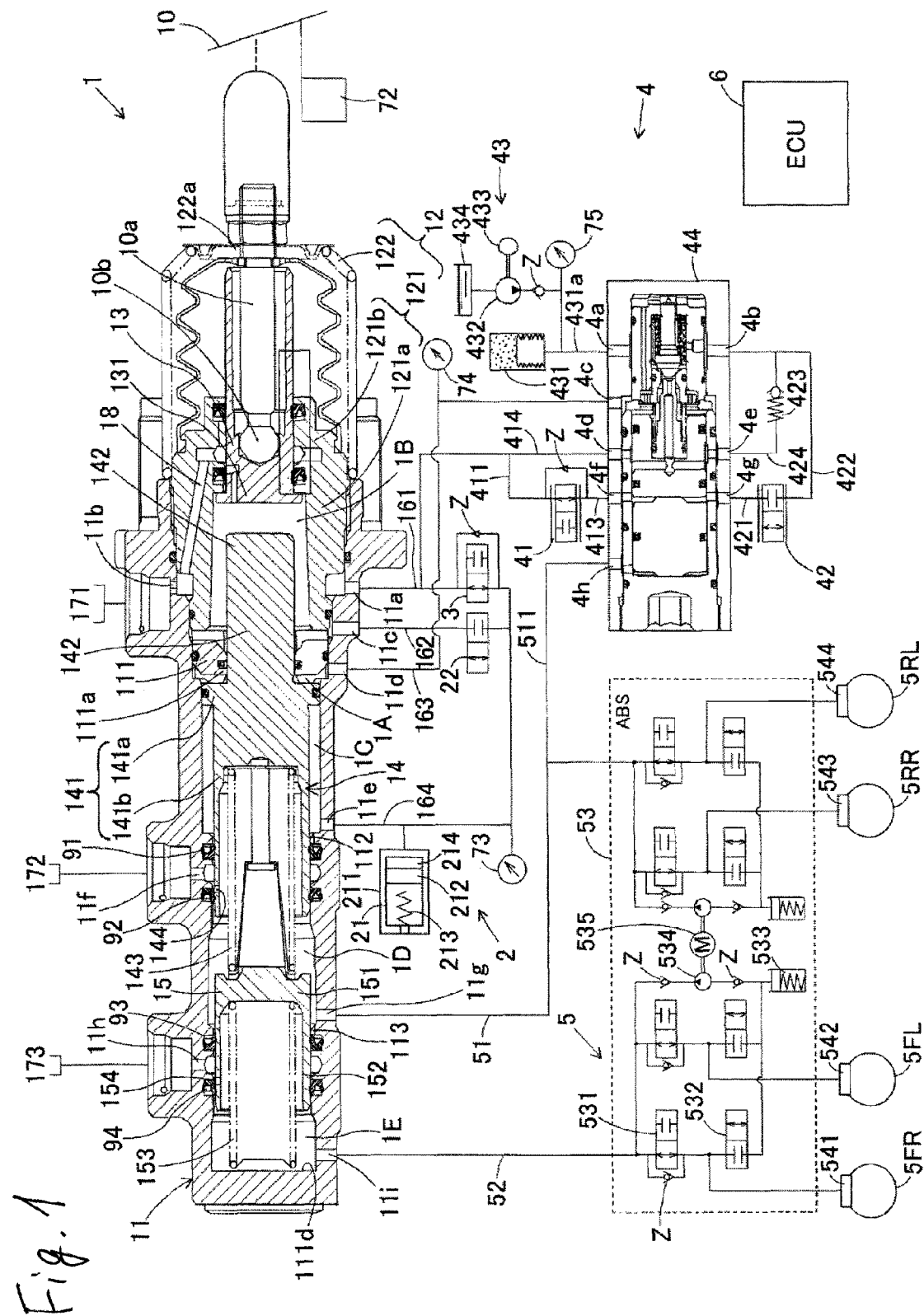
FIG. 1 is a partially cross-sectional explanatory diagram that illustrates a configuration of a vehicle brake device of the present embodiment.

As illustrated in FIG. 1, the vehicle brake device of the present embodiment mainly includes a master cylinder 1, a reactive force generator 2, a separation lock valve 22, a reactive force valve 3, a servo pressure generator 4, a brake device 5, a brake ECU 6, and various sensors 72 to 75 capable of communicating with the brake ECU 6. In addition, in the present embodiment, a well-known hybrid ECU (not illustrated) is connected to the brake ECU 6.

Master Cylinder 1

The master cylinder 1 is a cylinder that supplies the brake fluid to the brake device 5, and mainly has a main cylinder 11, a cover cylinder 12, an input piston 13, a first master piston 14, and a second master piston 15.

The main cylinder 11 is a substantially cylindrical cylinder with a bottom that has an opening at one end thereof and a bottom surface at the other end thereof. Hereinafter, in regard to the master cylinder 1, the description will be made by setting the opening side of the main cylinder 11 to a back, and the bottom surface side of the main cylinder 11 to a front. The main cylinder 11 has an inner wall portion 111 for separating the opening side and the bottom surface side of the main cylinder 11 in an interior thereof. In the center of the inner wall portion 111, a through hole 111a is formed which axially (in a front and back direction) penetrates.

Furthermore, in the interior of the main cylinder 11, parts 112 (front) and 113 (back), inner diameters of which become smaller, are present at the front of the inner wall portion 111. That is, small-diameter parts 112 and 113 are projected from a partially whole circumference of the inner peripheral surface of the main cylinder 11 in the axial direction. That is, in the interior of the main cylinder 11, both master cylinders 14 and 15 described later are placed in an axially slidable manner. In addition, ports through which the interior and the exterior communicate with each other will be described later.

The cover cylinder 12 has a substantially cylindrical cylinder portion 121, and a cup-shaped cover portion 122. The cylinder portion 121 is placed at a back end side of the main cylinder 11 and is coaxially fitted to the opening of the main cylinder 11. An inner diameter of a front part 121a of the cylinder portion 121 is greater than an inner diameter of a back part 121b. Furthermore, an inner diameter of the front part 121a is greater than an inner diameter of the through hole 111a of the inner wall portion 111.

The cover portion 122 is assembled to the back end portion of the main cylinder 11 and the outer peripheral surface of the cylinder portion 121 so as to occupy the opening of the main cylinder 11 and the back end side opening of the cylinder portion 121. A bottom wall of the cover portion 122 is formed with a through hole 122a. The cover portion 122 is made of an elastic member that can be axially expanded or contracted, and a lower wall thereof is biased backward.

The input piston 13 is a piston that slides in the cover cylinder 12 according to the operation of the brake pedal 10. The input piston 13 is a substantially cylindrical piston with a bottom that has a bottom surface at the front thereof and an opening at the back thereof. A bottom wall 131 constituting the bottom surface of the input piston 13 has a diameter that is greater than those of other parts of the input piston 13. The input piston 13 is placed so that the bottom wall 131 is located at the back end of the front part of the cylinder portion 121. The input piston 13 is placed in the back part 121b of the cylinder portion 121 in an axially slidable and liquid-tight manner.

In the input piston 13, an operation rod 10a and a pivot 10b of the brake pedal 10 are provided. The operation rod 10a is projected to the outside through the opening of the input piston 13 and the through hole 122a of the cover member 122, and is connected to the brake pedal 10. The operation rod 10a is moved in conjunction with the operation of the brake pedal 10, and advances while axially pushing the cover portion 122 when stepping the brake pedal 10. The input piston 13 also advances along with the advancement of the operation rod 10a.

The first master piston 14 is placed in the main cylinder 11 in an axially slidable manner. Specifically, the first master piston 14 includes a first main body portion 141 and a projection portion 142. The first main body portion 141 is placed coaxially at the front side of the inner wall portion 111 in the main cylinder 11. The first main body portion 141 is formed in a substantially cylindrical shape with a bottom that has an opening at the front thereof and a bottom wall 141a at the back thereof. That is, the first main body portion 141 includes the bottom wall 141a and a peripheral wall portion 141b.

The bottom wall 141a is placed in the main cylinder 11 at the front of the inner wall portion 111 in an axially slidable and liquid-tight manner. The peripheral wall portion 141b is formed in a cylindrical shape having a diameter smaller than that of the bottom wall 141a, and is coaxially extended forward from the center of a front end surface of the bottom wall 141a. The front part of the peripheral wall portion 141b is placed in a small-diameter part 112 in an axially slidable and liquid-tight manner. The back part of the peripheral wall portion 141b is separated from the inner peripheral surface of the main cylinder 11.

The projection portion 142 is a columnar part that is projected backward from the end surface center of the bottom wall 141a of the first main body portion 141. The projection portion 142 is placed in the through hole 111a of the inner wall portion 111 in an axially slidable and liquid-tight manner. The back part of the projection portion 142 is located inside the cylinder portion 121 via the through hole 111a. The back part of the projection portion 142 is separated from the inner peripheral surface of the cylinder portion 121. The back end surface of the projection portion 142 is separated from the bottom wall 131 of the input piston 13 by a predetermined distance. The first master piston 14 is biased backward by a biasing member 143 consisting of a spring or the like.

Herein, a "servo chamber 1A" is partitioned by a back end surface of the bottom wall 141a of the first main body portion 141, a front end surface of the inner wall portion 111, an inner peripheral surface of the main cylinder 11, and an outer peripheral surface of the projection portion 142. Furthermore, a "first reactive force chamber 1B" is partitioned by a back end surface of inner wall portion 111, an outer surface of the input piston 131, an inner peripheral surface of a front part 121a of the cylinder portion 121, and an outer surface of the projection portion 142. Furthermore, a "second reactive force chamber C" is partitioned by a back end surface (including a seal member 91) of the small-diameter part 112, an outer peripheral surface of the first master piston 14, and an inner peripheral surface of the main cylinder 11.

The second master piston 15 is coaxially placed at the front side of the first master piston 14 in the main cylinder 11. The second master piston 15 is formed in a substantially cylindrical shape with a bottom that has an opening at the front thereof and a bottom wall 151 at the back thereof. That is, the second master piston 15 includes the bottom wall 151, and a peripheral wall portion 152 having the same diameter as that of the bottom wall 151. The bottom wall 151 is placed between the small-diameter parts 112 and 113 in front of the first master piston 14. The back part of the second master piston 15 including the bottom wall 151 is separated from the inner peripheral surface of the main cylinder 11. The peripheral wall portion 152 has a cylindrical shape and is coaxially extended forward from the bottom wall 151. The peripheral wall portion 152 is placed in the small-diameter part 113 in an axially slidable and liquid-tight manner. The second master piston 15 is biased backward by a biasing member 153 made of a spring or the like.

Herein, a "first fluid pressure chamber 1D" is partitioned by an outer surface of the second master piston 15, a front end surface of the first master piston 14, and inner surface of the first master piston, a front end surface (including a seal member 92) of the small-diameter part 112, a back end surface (including a seal member 93) of the small-diameter part 113, and an inner peripheral surface of the main cylinder 11 between the small-diameter parts 112 and 113. Furthermore, a "second fluid pressure chamber 1E" is partitioned by the inner bottom surface 111d of the main cylinder 11, a front end surface of the second master piston 15, an inner surface of the second master piston 15, a front end surface (including a seal member 94) of the small-diameter part 113, and the inner peripheral surface of the main cylinder 11.

The master cylinder 1 is formed with ports 11a to 11i through which the interior and the exterior communicate with each other. The port 11a is formed behind the inner wall portion 111 of the main cylinder 11. The port 11b is formed at the same axial position as that of the port 11a to face the port 11a. The ports 11a and 11b communicate with each other via a space between the inner peripheral surface of the main cylinder 11 and the outer peripheral surface of the cylinder portion 121. The port 11a is connected to a pipe 161. The port 11b is connected to a reservoir 171. That is, the port 11a communicates with the reservoir 171.

Furthermore, the port 11b communicates with the first reactive force chamber 1B by a passage 18 formed in the cylinder portion 121 and the input piston 13. The passage 18 becomes separated when the input piston 13 advances. That is, when the input piston 13 advances, the first reactive force chamber 1B and the reservoir 171 are separated from each other.

The port 11c is formed in front of the port 11a and causes the first reactive force chamber 1B and the pipe 162 to communicate with each other. The port 11d is formed in front of the port 11c, and causes the servo chamber 1A and the pipe 163 to communicate with each other. The port 11e is formed in front of the port 11d, and causes the second reactive force chamber 1C and the pipe 164 to communicate with each other.

The port 11f is formed between the both seal members 91 and 92 of the small-diameter part 112 and causes a reservoir 172 and the interior of the main cylinder 11 to communicate with each other. The port 11f communicates with the first fluid pressure chamber 1D via a passage 144 formed in the first master piston 14. The passage 144 is located at a slight back position of the seal member 92 so that the port 11f and the first fluid pressure chamber 1D are separated from each other when the first master piston 14 advances.

The port 11g is formed in front of the port 11f and causes the first fluid pressure chamber 1D and the pipe 51 to communicate with each other. The port 11h is formed between both seal members 93 and 94 of the small-diameter part 113 and causes the reservoir 173 and the interior of the main cylinder 11 to communicate with each other. The port 11g communicates with the second fluid pressure chamber 1E via a passage 154 formed in the second master piston 15. The passage 154 is located at a slight back position of the seal member 94 so that the port 11g and the second fluid pressure chamber 1E are separated from each other when the second master piston 15 advances. The port 11i is formed in front of the port 11h and causes the second fluid pressure chamber 1E and the pipe 52 to communicate with each other.

Furthermore, in the master cylinder 1, a seal member (a black circle portion in the drawings) such as an O-ring is suitably placed. The seal members 91 and 92 are placed in the small-diameter part 112, and come into contact with the outer peripheral surface of the first master piston 14 in a liquid-tight manner. Similarly, the seal members 93 and 94 are placed in the small-diameter part 113, and come into contact with the outer peripheral surface of the second master piston 15 in a liquid-tight manner. Furthermore, a seal member is also placed between the input piston 13 and the cylinder portion 121.

The stroke sensor 72 is a sensor that detects an amount of stroke (an amount of operation) of the brake pedal 10, and transmits the detection result to the brake ECU 6.
Reactive Force Generator 2

The reactive force generator 2 includes a stroke simulator 21. The stroke simulator 21 is a device that generates the reactive force pressure in the first reactive force chamber 1B and the second reactive force chamber 1C according to the operation of the brake pedal 10. In general, the stroke simulator 21 is configured so that the piston 212 is slidably fitted to the cylinder 211, and a pilot fluid chamber 214 is formed at the front side of the piston 212 biased forward by the compression spring 213. The stroke simulator 21 is connected to the second reactive force chamber 1C via the pipe 164 and the port 11e, and is connected to a separation lock valve 22 and the reactive force valve 3 via the pipe 164.

(Separation Lock Valve 22)

The separation lock valve 22 is a usually closed-type electromagnetic valve (a linear valve), and opening and closing thereof is controlled by the brake ECU 6. The separation lock valve 22 is connected to the pipe 164 and the pipe 162 to connect/disconnect both pipes 162 and 164. The separation lock valve 22 is a valve for connecting/disconnecting the first reactive force chamber 1B and the second reactive force chamber 1C.

The pressure sensor 73 is a sensor that mainly detects the pressure (the reactive force pressure) of the reactive force chambers 1B and 1C, and is connected to the pipe 164. The pressure sensor 73 detects the pressure of both reactive force chambers 1B and 1C when the separation lock valve 22 is opened, and detects the pressure of the second reactive force chamber 1C when the separation lock valve 22 is closed.

(Reactive Force Valve 3)

The reactive force valve 3 is a usually opened-type electromagnetic valve, and opening and closing thereof is controlled by the brake ECU 6. The reactive force valve 3 is connected to the pipe 164 and the pipe 161 to connect/disconnect both pipes 161 and 164. The reactive force valve 3 is a valve for connecting/disconnecting the reactive force chambers 1B and 1C and the reservoir 171.

(Control of Separation Lock Valve 22 and Reactive Force Valve 3)

Herein, the control of the reactive force valve 3 and the separation lock valve 22 using the brake ECU 6 during brake operation will be described. When the brake pedal 10 is stepped, the input piston 13 advances, the passage 18 is separated, and the reservoir 171 and the first reaction force chamber 1B are cut off. At the same time, the reactive force valve 3 enters the closed state (open close), and the separation lock valve 22 enters the opened state (close open). The reactive force valve 3 enters the closed state, and thus the second reactive force chamber 1C and the reservoir 171 are cut off. The separation lock valve 22 enters the opened state, and thus the first reaction force chamber 1B and the second reactive force chamber 1C come into contact with each other. That is, the input piston 13 advances and the reactive force valve 3 enter the closed state, and thus both reactive force chambers 1B and 1C are cut off from the reservoir 171. Moreover, the stroke simulator 21 generates reactive force pressure depending on the stroke quantity in both reactive force chambers 1B and 1C.

(Servo Pressure Generator 4)

The servo pressure generator 4 mainly includes a pressure decrease valve 41, a pressure increase valve 42, a pressure supply portion 43, and a regulator 44. The pressure decrease valve 41 is a usually opened-type electromagnetic valve, and the flow rate thereof is controlled by the brake ECU 6. One side of the pressure decrease valve 41 is connected to the pipe 161 via the pipe 411, and the other side thereof is connected to the pipe 413. That is, one side of the pressure decrease valve 41 communicates with the reservoir 171 through the pipes 411 and 161 and the ports 11a and 11b. The pressure increase valve 42 is a usually closed-type electromagnetic valve, and the flow rate thereof is controlled by the brake ECU 6. One side of the pressure increase valve 42 is connected to the pipe 421, and the other side thereof is connected to the pipe 422.

The pressure supply portion 43 is means for supplying the high-pressure brake fluid to the regulator 44, based on the instruction of the brake ECU 6. The pressure supply portion 43 mainly has an accumulator 431, a fluid pressure pump 432, a motor 433, and a reservoir 434.

The accumulator 431 accumulates the fluid pressure generated by the fluid pressure pump 432. The accumulator 431 is connected to the regulator 44, the pressure sensor 75, and the fluid pressure pump 432 by pipe 431a. The fluid pressure pump 432 is connected to the motor 433 and the reservoir 434. The fluid pressure pump 432 supplies the brake fluid collected in the reservoir 434 to the accumulator 431 by driving the motor 433. The pressure sensor 75 detects the pressure of the accumulator 431, but the value thereof is related to an amount of consumption of the brake fluid accumulated in the accumulator 431. In addition, as values corresponding to the brake fluid consumption correlative value, there are a servo pressure increased using the brake fluid of the accumulator 431, or a reactive force pressure rising due to the rise of the servo pressure.

When the pressure sensor 75 detects that the accumulator pressure is lowered to a predetermined value or less, the motor 433 is driven based on the control signal from the brake ECU 6, and the fluid pressure pump 432 supplies the brake fluid to the accumulator 431 and replenishes pressure energy to the accumulator 431.

Figure 2:
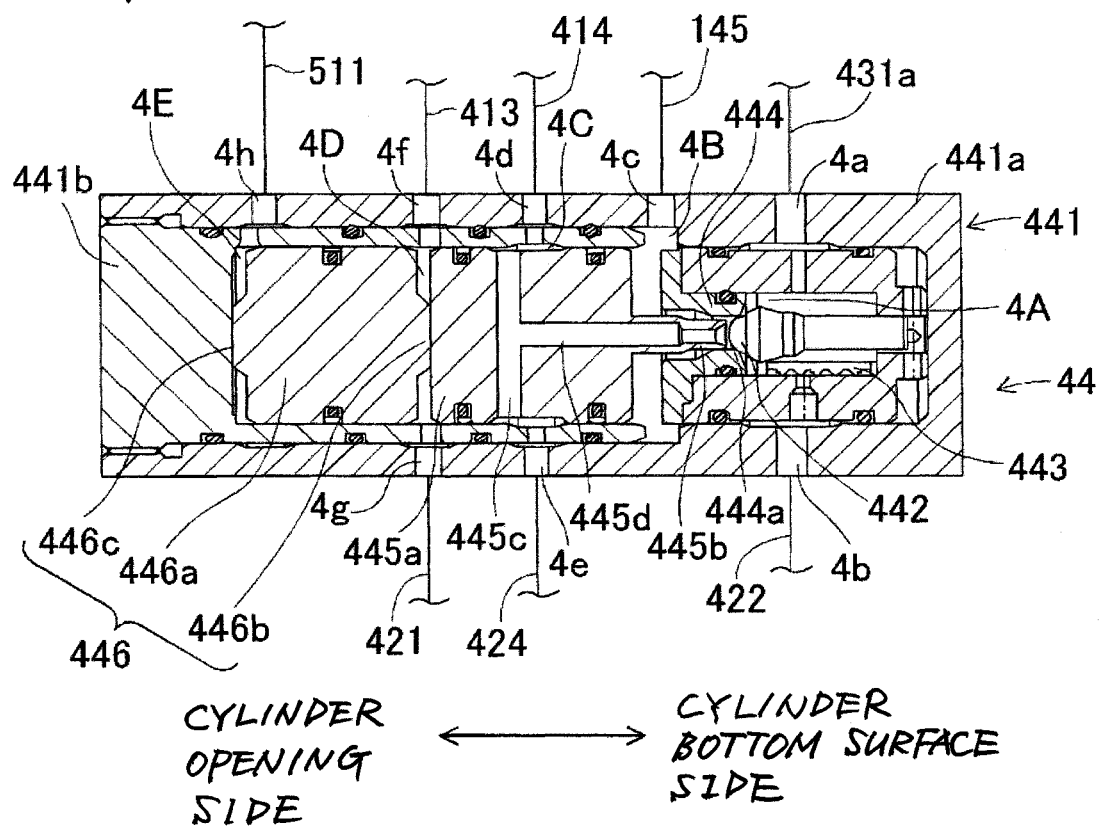
FIG. 2 is a partially cross-sectional explanatory diagram that illustrates a configuration of regulator of the present embodiment.

The regulator 44 is a device in which mainly a sub piston 446 is added to a general regulator. That is, as illustrated in FIG. 2, the regulator 44 mainly includes a cylinder 441, a ball valve 442, a biasing portion 443, a valve seat portion 444, a control piston 445, and a sub piston 446.

The cylinder 441 includes a substantially cylindrical cylinder case 441a with a bottom having a bottom surface at one side (the right side in the drawings), and a lid member 441b that occupies the opening (a left side in the drawings) of the cylinder case 441a. In addition, although the lid member 441b is formed to have a U-shaped cross-section in the drawings, in the present embodiment, the description will be made by forming the lid member 441b in a columnar shape and setting a part occupying the opening of the cylinder case 441a as the lid member 441b. The cylinder case 441a is formed with a plurality of ports 4a to 4h through which the interior and the exterior communicate with each other.

The port 4a is connected to the pipe 431a. The port 4b is connected to the pipe 422. The port 4c is connected to the pipe 163. The port 4d is connected to the pipe 161 via the pipe 411. The port 4e is connected to the pipe 424 communicating with the pipe 422 via a relief valve 423. The port 4f is connected to the pipe 413. The port 4g is connected to the pipe 421. The port 4h is connected to the pipe 511 branched from the pipe 51.

The ball valve 442 is a ball-like valve, and is placed at the bottom surface side (hereinafter, also referred to as cylinder bottom surface side) of the cylinder case 441a in the interior of the cylinder 441. The biasing portion 443 is a spring member that biases the ball valve 442 to the opening side (hereinafter, also referred to as a cylinder opening side) of the cylinder case 441a, and is placed on the bottom surface of the cylinder case 441a. The valve seat portion 444 is a wall member provided on the inner peripheral surface of the cylinder case 441a, and partitions a cylinder opening side and a cylinder bottom surface side. In the center of the valve seat portion 444, a through path 444a is formed through which the partitioned cylinder opening side and the cylinder bottom surface side communicate with each other. The valve member 444 holds the ball valve 442 from the cylinder opening side in a state in which the biased ball valve 442 blocks the through path 444a.

A space partitioned by the ball valve 442, the biasing portion 443, the valve seat portion 444, and the inner peripheral surface of the cylinder case 441a of the cylinder bottom surface side is referred to as a first chamber 4A. The first chamber 4A is filled with the brake fluid, is connected to the pipe 431a via the port 4a, and is connected to the pipe 422 via the port 4b.

The control piston 445 includes a substantially columnar main body portion 445a, and a substantially columnar projection portion 445b having a diameter that is smaller than that of the main body portion 445a. In the interior of the cylinder 441, the main body portion 445a is placed axially slidably at the cylinder opening side of the valve seat portion 444 in a coaxial and liquid-tight manner. The main body portion 445a is biased to the cylinder opening side by a biasing member not illustrated. In a substantially center of the main body portion 445a in the cylinder axial direction, a passage 445c is formed in which both ends are extended in a circumferential direction (a vertical direction in the drawing) opened to the peripheral surface of the main body portion 445a. A partial inner peripheral surface of the cylinder 441 corresponding to the arrangement position of the opening of the passage 445c is formed with the port 4d, and a concave hollow and the main body portion 445a form a third chamber 4C.

The projection portion 445b is projected from the center of the bottom surface side end surface of the cylinder of the main body portion 445a to the cylinder bottom surface side. A diameter of the projection portion 445b is smaller than that of the through path 444a of the valve seat portion 444. The projection portion 445b is placed on the same axis of the through path 444a. A leading end of the projection portion 445b is separated from the ball valve 442 to the cylinder opening side by a predetermined interval. The projection portion 445b is formed with a passage 445d extended in the cylinder axial direction opened to the center of the bottom surface side end surface of the cylinder of the projection portion 445b. The passage 445d is stretched up to the interior of the main body portion 445a, and is connected to the passage 445c.

A space partitioned by a cylinder bottom side end surface of the main body portion 445a, the outer surface of the projection portion 445b, the inner peripheral surface of the cylinder 441, the valve seat portion 444, and the ball valve 442 are referred to as a second chamber 4B. The second chamber 4B communicates with the ports 4d and 4e via the passages 445c and 445d and the third chamber 4C.

The sub piston 446 includes a sub main body portion 446a, a first projection portion 446b, and a second projection portion 446c. The sub main body portion 446a is formed in a substantially columnar shape. In the interior of the cylinder 441, the sub main body portion 446a is placed axially slidably at the cylinder opening side of the main body portion 445a in a coaxial and liquid-tight manner.

The first projection portion 446b has a substantially columnar shape having a diameter smaller than that of the sub main body portion 446a, and is projected from the end surface center of the cylinder bottom surface side of the sub main body portion 446a. The first projection portion 446b comes into contact with the end surface of the cylinder opening side of the main body portion 445a. The second projection portion 446c has the same shape as the first projection portion 446b, and is projected from the end surface center of the cylinder opening side of the sub main body portion 446a. The second projection portion 446c comes into contact with the lid member 441b.

A space partitioned by the end surface of the cylinder bottom surface side of the sub main body portion 446a, the outer surface of the first projection portion 446b, the end surface of the cylinder opening side of the control piston 445, and the inner peripheral surface of the cylinder 441 are referred to as a pressure control chamber 4D. The pressure control chamber 4D communicates with the pressure decrease valve 41 via the port 4f and the pipe 413, and communicates with the pressure increase valve 42 via the port 4g and the pipe 421.

Meanwhile, a space partitioned by the end surface of the cylinder opening side of the sub main body portion 446a, the outer surface of the second projection portion 446c, the lid member 441b, and the inner peripheral surface of the cylinder 441 are referred to as a fourth chamber 4E. The fourth chamber 4E communicates with the port 11g via the port 4h and the pipes 511 and 51. The respective chambers 4A to 4E are filled with the brake fluid. The pressure sensor 74 is a sensor for detecting the pressure (the servo pressure) of the servo chamber 1A, and is connected to the pipe 163.

(Brake 5)

Wheel cylinders 541 to 544 communicate with the first fluid pressure chamber 1D and the second fluid pressure chamber 1E generating the master cylinder pressure via the pipes 51 and 52 and the ABS 53. The wheel cylinders 541 to 544 constitute the brake 5 of vehicle wheels 5FR to 5RL. Specifically, a well-known Anti-lock Brake System (ABS) 53 is connected to the port 11g of the first fluid pressure chamber 1D and the port 11i of the second fluid pressure chamber 1E via the pipes 51 and 52, respectively. The wheel cylinders 541 to 544 operating the brake device that brakes the vehicle wheels 5FR to 5RL are connected to the ABS 53.

Herein, in regard to the ABS 53, the configuration of one (5FR) of four wheels will be described, and since the other configurations are the same, the description thereof will be omitted. The ABS 53 includes a holding valve 531, a pressure decrease valve 532, a reservoir 533, a pump 534, and a motor 535. The holding valve 531 is a usually opened-type electromagnetic valve, and the opening and closing thereof is controlled by the brake ECU 6. The holding valve 531 is placed so that one side thereof is connected to the pipe 52, and the other side thereof is connected to the wheel cylinder 541 and the pressure decrease valve 532. That is, the holding valve 531 is an input valve of the ABS 53.

The pressure decrease valve 532 is a usually closed-type electromagnetic valve, and the opening and closing thereof is controlled by the brake ECU 6. The pressure decrease valve 532 is configured so that one thereof is connected to the wheel cylinder 541 and the holding valve 531, and the other thereof is connected to the reservoir 533. When the pressure decrease valve 532 enters the opened state, the wheel cylinder 541 and the reservoir 533 communicate with each other.

The reservoir 533 stores the brake liquid, and is connected to the pipe 52 via the pressure decrease valve 532 and the pump 534. The pump 534 is configured so that an inlet is connected to the reservoir 533 and an outlet thereof is connected to the pipe 52 via a check valve z. Herein, the check valve z allows the flow from the pump 534 to the pipe 52 (the second fluid pressure chamber 1E), and restricts the flow in the reverse direction thereof. The pump 534 is driven by the operation of the motor 535 depending on the command of the brake ECU 6. The pump 535 sucks the brake fluid in the wheel cylinder 541 and the brake fluid stored in the reservoir 533 and returns the brake fluid to the second fluid pressure chamber 1E at the time of the decompression mode of the ABS control. In addition, in order to alleviate the pulsation of the brake fluid discharged by the pump 534, a damper (not illustrated) is disposed at the upstream side of the pump 534.

The ABS 53 includes a vehicle wheel speed sensor 76 that detects the vehicle wheel speed. The detection signal indicating the vehicle wheel speed detected by the vehicle wheel speed sensor 76 is output to the brake ECU 6.

In the ABS 53 configured in this manner, the brake ECU 6 changes and controls the opening and closing of the respective electromagnetic valves 531 and 532, based on the master cylinder pressure, the vehicle wheel speed state, and the front and back acceleration, operates the motor 535 depending on necessity, and performs the ABS control (anti-lock brake control) that adjusts the brake fluid pressure applied to the wheel cylinder 541, that is, the braking force applied to the vehicle wheel 5FR. The ABS 53 is a device (corresponding to a "supply fluid pressure adjuster") that adjusts an amount and timing of the brake fluid supplied from the master cylinder 1 based on the instruction of the brake ECU 6, and supplies the brake fluid to the wheel cylinders 5FR to 5RL.

In a linear mode described later, the fluid pressure sent from the accumulator 431 of the servo pressure generator 4 is controlled by the pressure increase valve 42 and the pressure decrease valve 41, and the servo pressure is generated in the servo chamber 1A. Thus, the first master piston 14 and the second master piston 15 advance, and the first fluid pressure chamber 1D and the second fluid pressure chamber 1E are pressed. The fluid pressure of the first fluid pressure chamber 1D and the second fluid pressure chamber 1E is supplied to the wheel cylinders 541 to 544 as the master cylinder pressure via the pipes 51 and 52 and the ABS 53 from the ports 11g and 11i, and the fluid pressure braking force is applied to the vehicle wheels 5FR to 5RL.

(Brake ECU 6)

The brake ECU 6 is an electronic control unit, and communicates with various sensors 72 to 75 to control the respective electromagnetic valves 22, 3, 41, 42, 531 and 532, the motors 433 and 535 or the like. The brake ECU 6 stores two control modes of a linear mode and an REG mode. The linear mode is a normal brake control, and is a mode that opens the separation lock valve 22, controls the pressure decrease valve 41 and the pressure increase valve 42 in a state of closing the reactive force valve 3, and controls the servo pressure of the servo chamber 1A. The REG mode is a mode that sets the pressure decrease valve 41, the pressure increase valve 42, the separation lock valve 22, and the reactive force valve 3 to the non-communication state or a mode until entering the non-communication state (the state maintenance) due to the malfunction or the like.

(Linear Mode)

In a state where the brake pedal 115 is not stepped, the same state as mentioned above, that is, there is a state where the ball valve 442 blocks the through path 444a of the valve seat portion 444. Furthermore, the pressure decrease valve 41 enters the opened state, and the pressure increase valve 42 enters the closed state. That is, the first chamber 4A and the second chamber 4B are separated from each other.

The second chamber 4B communicates with the servo chamber 1A via the pipe 163 and the chambers are kept at the same pressure. The second chamber 4B communicates with the third chamber 4C via the passages 445c and 445d of the control piston 445. Thus, the second chamber 4B and the third chamber 4C communicate with reservoir 171 via the pipes 414 and 161. The pressure control chamber 4D is configured so that one side thereof is blocked by the pressure increase valve 42 and the other side thereof communicates with the reservoir 171 via the pressure decrease valve 41. The pressure control chamber 4D and the second chamber 4B are kept at the same pressure. The fourth chamber 4E communicates with the first fluid pressure chamber 1D via the pipes 511 and 51, and the chambers are kept at the same pressure.

From this state, when the brake pedal is stepped, after a predetermined revival period, the brake ECU 6 controls the pressure decrease valve 41, the pressure increase valve 42 and the motor 433, based on information from the various sensors 71 and 72. That is, the brake ECU 6 controls the pressure decrease valve 41 in a closing direction, controls the pressure increase valve 42 in an opening direction, and controls the pressure of the accumulator 431 using the motor 433.

The accumulator 431 communicates with the pressure control chamber 4D by the opening of the pressure increase valve 42. The pressure control chamber 4D and the reservoir 171 are blocked by the closing of the pressure decrease valve 41. It is possible to raise the pressure of the pressure control chamber 4D by the high-pressure brake fluid supplied from the accumulator 431. The control piston 445 slides on the cylinder bottom surface side by the raising of the pressure of the pressure control chamber 4D. Thereby, the leading end of the projection portion 445b of the control piston 445 comes into contact with the ball valve 442, and the passage 445d is blocked by the ball valve 442. Moreover, the second chamber 4B and the reservoir 171 are cut off.

In addition, the control piston 445 slides on the bottom surface side of the cylinder, whereby the ball valve 442 is pushed and moved to the bottom surface side of the cylinder by the projection portion 445b, and the ball valve 442 is separated from the valve seat portion 444. Thereby, the first chamber 4A and the second chamber 4B communicate with each other by the through path 444a of the valve seat portion 444. The high-pressure brake fluid is supplied to the first chamber 4A from the accumulator 431, and thus the pressure of the second chamber 4B rises due to the communication.

Along with the pressure rise of the second chamber 4B, the pressure of the servo chamber 1A communicating therewith also rises. The first master piston 14 advances due to the pressure rise of the servo chamber 1A, and the pressure of the first fluid pressure chamber 1D rises. Moreover, the second master piston 15 also advances, and the pressure of the second fluid pressure chamber 1E rises. Due to the pressure rise of the first fluid pressure chamber 1D, the high-pressure brake fluid is supplied to an ABS 53 described later and the fourth chamber 4E. Although the pressure of the fourth chamber 4E rises, the pressure of the pressure control chamber 4D also rises in this manner, and thus the sub piston 446 is not moved. In this manner, the high-pressure brake fluid (master cylinder pressure) is supplied to the ABS 53, the brake 5 is operated, and thus the vehicle is braked. Force of causing the first master piston 14 to advance in the linear mode is equivalent to force corresponding to the servo pressure.

When releasing the brake operation, on the contrary, the pressure decrease valve 41 enters the opened state, the pressure increase valve 42 enters the closed state, and thus the reservoir 171 and the pressure control chamber 4D are caused to communicate with each other. Thereby, the control piston 445 retreats, and returns to a state before stepping the brake pedal 10.

(REG Mode)

In the REG mode, the pressure decrease valve 41, the pressure increase valve 42, the separation lock valve 22, and the reactive force valve 3 are not supplied with electricity (controlled), the pressure decrease valve 41 enters the opened state, the pressure increase valve 42 enters the closed state, the separation lock valve 22 enters the closed state, and the reactive force valve 3 enters the opened state. Moreover, the non-electricity state (non-control state) is maintained even after stepping the brake pedal 10.

In the REG mode, when the brake pedal 10 is stepped, the input piston 13 advances, the passage 18 is separated, and the first reactive force chamber 1B and the reservoir 171 are cut off. In this state, since the separation lock valve 22 is in the closed state, the first reactive force chamber 1B enters a sealed state. However, since the reactive force valve 3 is in the opened state, the second reactive force chamber 1C communicates with the reservoir 171.

Herein, when further stepping the brake pedal 10, the input piston 13 advances, the pressure of the first reactive force chamber 1B rises, and the first master piston 14 advances due to the pressure. At this time, since the pressure decrease valve 41 and the pressure increase valve 42 are not supplied with electricity, the servo pressure is not controlled. That is, the first master piston 14 advances only by force (pressure of the first pressure chamber 1B) corresponding to the operation force of the brake pedal 10. Thereby, although the volume of the servo chamber 1A is increased, since the servo chamber 1A communicates with the reservoir 171 via the regulator 44, the brake fluid is supplemented.

When the first master piston 14 advances, as in the linear mode, the pressure of the first fluid pressure chamber 1D and the second fluid pressure chamber 1E rises. Moreover, the pressure of the fourth chamber 4E also rises due to the pressure rise of the first fluid pressure chamber 1D. The sub piston 446 slides on the cylinder bottom surface side due to the pressure rise of the fourth chamber 4E. At the same time, the control piston 445 is pushed by the first projection portion 446b and slides on the cylinder bottom surface side. Thereby, the projection portion 445b comes into contact with the ball valve 442 and the ball valve 442 is pushed by the cylinder bottom surface side and moved. That is, the first chamber 4A communicates with the second chamber 4B, the servo chamber 1A and the reservoir 171 are cut off, and the high-pressure brake fluid due to the accumulator 431 is supplied to the servo chamber 1A.

In this manner, in the REG mode, when the brake pedal 10 is stepped by a predetermined stroke due to the operation force, the accumulator 431 and the servo chamber 1A communicate with each other, and the servo pressure rises without the control. Moreover, the first master piston 14 advances to a level equal to or greater than the operation force of a driver. Thereby, even when the respective electromagnetic valves are in the non-electricity state, the high-pressure brake fluid is supplied to the ABS 53. In the REG mode, a control map is made so as to generate brake force that is able to keep the stop safety in consideration of the time of slope stop or the like.

Force causing first master piston 14 to advance in the REG mode is equivalent to force corresponding to the operation force. That is, force corresponding to the operation force refers to force causing the first master piston 14 to advance only by the operation force, and force causing the first master piston 14 to advance by the servo pressure that is mechanically generated based on the driving thereof.

(Control Related to Abnormality Detection9

Herein, the control for detection abnormality (malfunction and failure) of the respective electromagnetic valves 22, 3, 41 and 42, the master system and the Reg system will be described with reference to FIGS. 3 and 4. Abnormality of the Reg system will be described later.

In the abnormality check, firstly, the brake ECU 6 personally checks (determines) whether or not the brake ECU 6 is just after the startup (S101). For example, like just after a driver gets on and the ignition is turned ON, just after the brake ECU 6 is started up, the process is shifted to a simple check mode (S201). The simple check mode will be described later.

For example, like when a drive gets off, when the brake ECU 6 is in a state that is not just after the startup (S101: No), it is checked whether or not it is a determination permission state (S102). The determination permission state is a state where the brake pedal 10 is not actually stepped, and is a state that is not (for example, a driver does not sit on a seat) a state where the brake pedal 10 is stepped. When the determination is permitted (S102: Yes), the brake ECU 6 controls the servo pressure generator 4 to automatically press the servo chamber 1A (S103).

That is, the brake ECU 6 instructs the closing (the command to the closed state) to the pressure decrease valve 41, instructs the opening to the pressure increase valve 42, regardless of the operation of the brake pedal 10, supplies the brake fluid to the servo chamber 1A under pressure, and gradually increases the servo pressure. In addition, at this time, the separation lock valve 22 and the reactive force valve 3 are not controlled (supplied with electricity), and in a normal state, the separation lock valve 22 enters the closed state, and the reactive force valve 3 enters the opened state (see FIG. 1).

Herein, it is checked whether or not the servo pressure is 0 based on information of the pressure sensor 74 (S104). When the servo pressure is 0 (S104: No), it is understood that the motor 433 is not operated, or the pressure decrease valve 41 or the pressure increase valve 42 is not operated according to the instructions. Herein, it is further checked whether or not the accumulator pressure is reduced based on information of the pressure sensor 75 (S105).

When the accumulator pressure is not reduced (S105: No), an OFF malfunction (fixing in an OFF state, that is, in the closed state) of the pressure increase valve 42 is determined (S107), and an abnormal flag is stored in a stand-up state. The determination can be referred to FIG. 5A. On the contrary, when the accumulator pressure is reduced (S105: Yes), an OFF malfunction (fixing in an OFF state, that is, in the opened state) of the pressure decrease valve 41 is determined (S106), and an abnormal flag is stored in a stand-up state. The determination can be referred to FIG. 5B. In the drawings, "open", "close" and "ON", "OFF" refer to the instructions from the brake ECU 6. In addition, the OFF malfunction (not turned ON but in the OFF state) of the motor 433 can be referred to FIG. 5C.

Meanwhile, when the servo pressure rises (S104: Yes), it is understood that the pressing control of the servo chamber 1A is normally performed. Herein, it is checked whether or not the reactive force pressure is 0, based on information of the pressure sensor 73 (S108). When the reactive pressure rises (S108: No), the second reactive force chamber 1C and the reservoir 171 originally needed to communicate with each other by the reactive force valve 3 (open) are cut off. That is, in this case, an ON malfunction (fixing in an ON state, that is, in the closed state) of the reactive force valve 3 is determined (S109), and an abnormal flag is stored in a stand-up state. The determination can be referred to FIG. 6A.

When the reactive force pressure is nearly 0 (S108: Yes), the second reactive force chamber 1C communicates with the reservoir 171, and it is understood that the reactive force valve 3 is normally OFF (opened state). Next, the brake ECU 6 gives the reactive force valve 3 the close instruction (S110). Moreover, it is checked whether or not the reactive force pressure is equal to or greater than a predetermined value, after a predetermined time elapses from the close instruction to the reactive force valve 3 (S111). When the reactive force pressure is less than a predetermined value (S111: No), it is understood that the state is one of a state of the OFF malfunction (fixed in the OFF state, that is, in the opened state) where the reactive force valve 3 is not operated with respect to the close instruction, or a state where the second reactive force chamber 1C communicates with the reservoir 171 via the first reactive force chamber 1B and the passage 18 since the separation lock valve 22 is in the opened state. That is, in this case, the OFF malfunction of the reactive force valve 3 or the ON malfunction of the separation lock valve 22 (fixed in the ON state, that is, in the opened state) is determined (S112), and the abnormal flag is stored in a stand-up manner. The determination of the OFF malfunction of the reactive force valve 3 or the ON malfunction of the separation lock valve 22 can be referred to FIG. 6B. Furthermore, the separating method will be described later.

Meanwhile, when the reactive force pressure is equal to or greater than a predetermined value (S111: Yes), it is understood that the separation lock valve 22 is normally OFF (closed state), and the reactive force valve 3 is normally ON (open→close) (S113).

Next, it is checked whether or not the servo pressure increased gradually is a predetermined value P1 (S114). When the servo pressure is less than P1 (S114: No), it is checked whether or not the reactive force pressure is a predetermined value P2 (S115). When the reactive force pressure reaches P2 before the servo pressure reaches P1 (S115: Yes), the first master piston 14 easily slides on the brake fluid supply to the servo chamber 1A, the first master piston 14 slides, and thus the volume of the second reactive force chamber 1C is reduced compared to the normal state. Thus, it is understood that the reactive force pressure to the servo chamber 1A is higher than a normal state. That is, for example, it is determined that there is a failure of the master system in which any one of the seal members 92 to 94 is damaged, and the first fluid pressure chamber 1D or the second fluid pressure chamber 1E communicates with reservoir 172 or the reservoir 173 (S116). Moreover, the abnormal flag is stored in a stand-up manner. Abnormality of the master system mainly refers to the failure of an oil leakage due to the damage of the seal member in the master cylinder 1, the damage of the pipes from the master cylinder 1 to the wheel cylinders 541 to 544, or the damage of the wheel cylinders 541 to 544. The determination of the master system failure can be referred to FIG. 7A. The second reactive force chamber 1C also serves (functions) as a verification chamber for verifying whether or not the master system is abnormal. In addition, when there is one reactive force chamber (or even when there are two reactive force chambers as in the present embodiment), it is possible to adopt a configuration in which a verification chamber is separately provided, a volume of which is reduced along with the advancement of the first master piston 14.

Meanwhile, when abnormality of the master system is not detected (S115: No), and the servo pressure reaches P1 (S114: No), the brake ECU 6 stops the control of gradually and continuously increasing the servo pressure from S103 to control the servo pressure uniformly (S117). Moreover, it is checked whether or not the reactive force pressure is the P2 (S118). When the reactive force pressure is not P2 (S118: No), that is, in a case of the servo pressure=P1, and the reactive force pressure≠P2 (the reactive force pressure<P2), abnormality of the Reg system is determined (S119), and the abnormal flag is stored in a stand-up manner. The determination can be referred to FIG. 7B.

Abnormality of the Reg system mainly refers to the failure of the oil leakage due to the damage of the seal members in the regulator 44. For example, when the pressure control chamber 4D and the fourth chamber 4E communicate with each other due to the damage of the seal members in the regulator 44, the brake fluid of the pressure of the pressure control chamber 4D corresponding to the servo pressure flows in the fourth chamber 4E, and flows the first fluid pressure chamber 1D from the fourth chamber 4E via the pipes 511 and 51. The pressure of the first fluid pressure chamber 1D rises, and the second master piston 15 advances. Moreover, the first fluid pressure chamber 1D enters the high-pressure state with the increase of the servo pressure, and the first master piston 14 is pushed from both axial sides by high pressure. The advancement distance of the first master piston 14 becomes smaller than the advancement distance of the normal state with respect to a predetermined servo pressure. Thereby, the pressure is hard to be applied to the second reactive force chamber 1C, and the reactive force pressure detected with respect to a predetermined servo pressure P1 becomes smaller than the reactive force pressure P2 of the normal state with respect to the predetermined servo pressure P1. Thus, it is possible to detect abnormality of the Reg system by detecting the reactive force pressure at the time of a predetermined servo pressure in the state mentioned above.

In addition, P1 is set to a certain degree of great value. That is, P1 is set so that the servo pressure does not reach P1 until the check step reaches S114. Thus, it is checked whether or not the reactive force pressure is P2 until the servo pressure reaches P1 (S115). In the present embodiment, P2 is set to a value of the reactive force pressure needed to be detected when the servo pressure is P1 in a case where there is no abnormality everywhere in the state of S114. However, the value may be set in consideration of slight error.

Meanwhile, when the reactive force pressure is P2 when the servo pressure is P1 (S118: Yes), that is, in a case of servo pressure=P1, and reactive force pressure=P2, it is determined that the master system and the Reg system are normal (S120).

Figure 4:
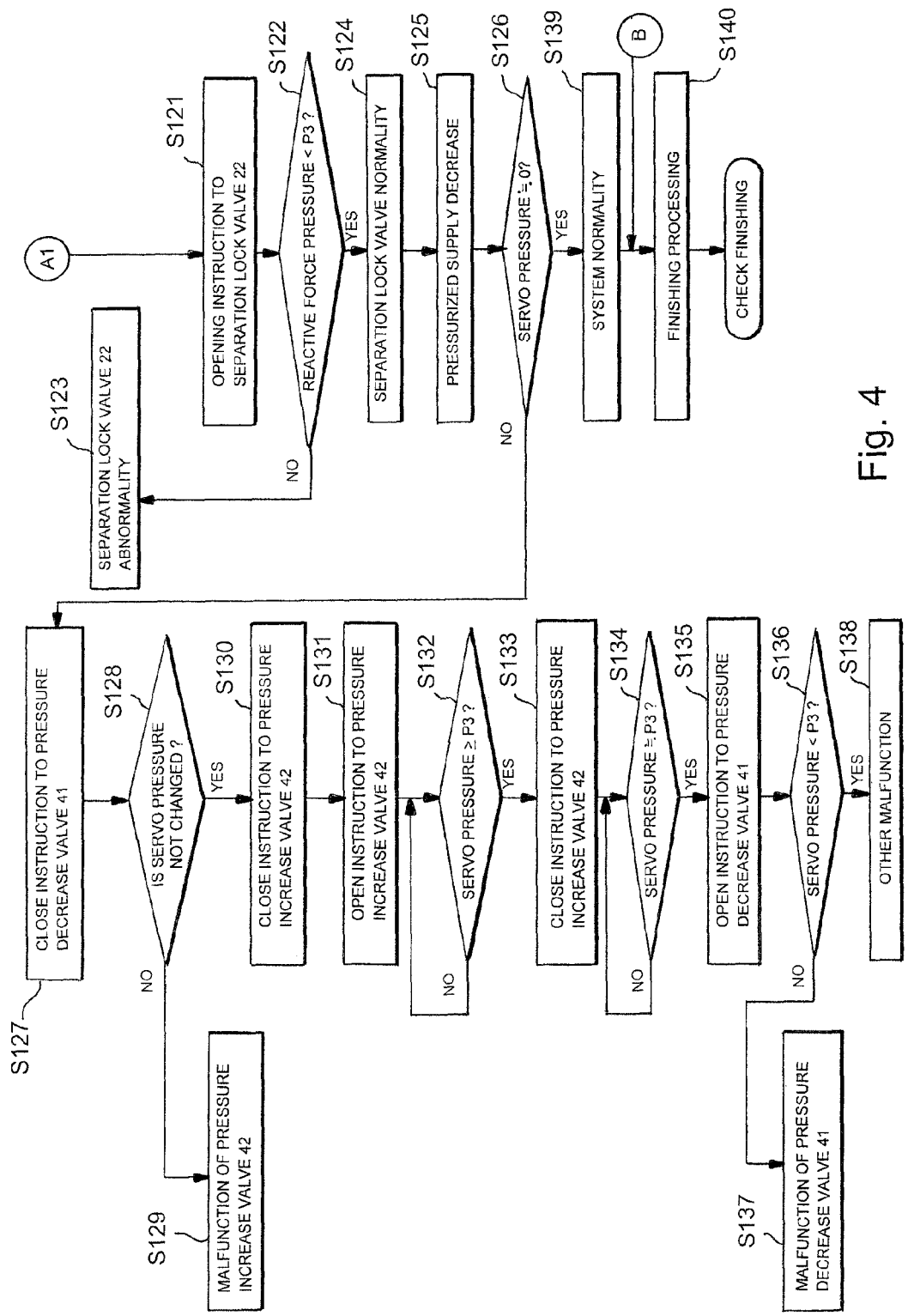
FIG. 4 is a flow chart related to the abnormality detection control.
Figure 8:
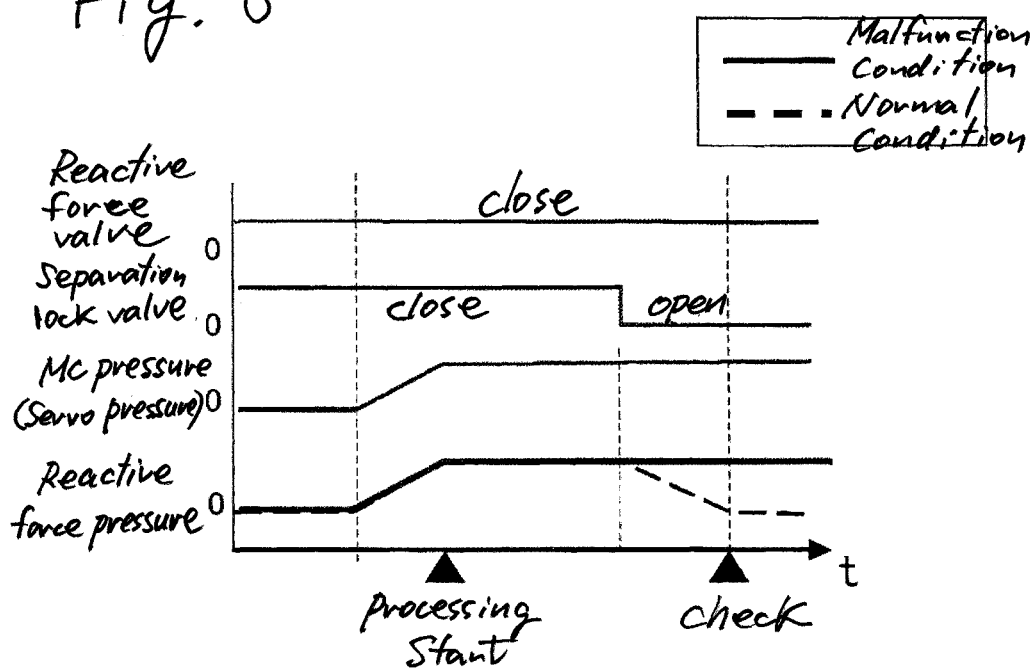
FIG. 8 is an explanatory diagram that illustrates a flow of processing related to the abnormality detection control.

Next, as illustrated in FIG. 4, the brake ECU 6 gives the separation lock valve 22 the open instruction (command to the open state) (S121). It is checked whether or not the reactive force pressure is less than a predetermined value P3 (S122). P3 is set to a value that is smaller than P2. When the reactive force pressure is equal to or greater than P3 (S122: No), since the separation lock valve 22 is not operated according to the instruction, it is understood that the first reactive force chamber 1B and the second reactive force chamber 1C do not communicate with each other, and the reactive force pressure does not drop. That is, in this case, the OFF malfunction (fixed in the OFF state, that is, in the closed state) of the separation lock valve 22 is determined (S123), and the abnormal flag is stored in a stand-up manner. Meanwhile, when the reactive force pressure is less than P3 (S122: Yes), it is determined that the separation lock valve 22 is normally ON (close→open) (S124). The determination of the OFF malfunction of the separation lock valve 22 can be referred to FIG. 8.

Thereafter, the servo pressure is decompressed by gradually reducing the pressing supply to the servo chamber (S125). Moreover, when the servo pressure is not nearly 0 even after a predetermined time elapses (S126: No), it is possible to determine the ON malfunction (fixed in the ON state, that is, in the closed state) of the pressure decrease valve 41 or the ON malfunction (fixed in the ON state, that is, in the opened state) of the pressure increase valve 42.

Thus, when the servo pressure is not nearly 0 (S126: No), the brake ECU 6 sets the pressure decrease valve 41 to the opened state (S127), and checks whether or not the servo pressure is changed based on information of the pressure sensor 74 (S128). When the servo pressure is changed (rises) (S128: No), the ON malfunction of the pressure increase valve 42 is determined (S129), and the abnormal flag is stored in a stand-up manner. This determination can be referred to FIG. 9A.

Meanwhile, when the servo pressure is not changed (S128: Yes), the pressure increase valve 42 can be determined to be normal. In this case, the pressure increase valve 42 is closed once (S130), and the pressure increase valve 42 and the pressure decrease valve 41 are set to the closed state. Thereafter, the open instruction is given only to the pressure increase valve 42 (S131), the servo pressure is raised up to a predetermined pressure P3 (S132). Thereafter, the pressure increase valve 42 is set to the closed state once more (S133). After that, it is confirmed that the servo pressure is kept in a predetermined pressure P3 based on information of the pressure sensor 74 (S134). If the keeping can be confirmed (S134: Yes), the open instruction is given to the pressure decrease valve 41 (S135). Herein, it is checked whether or not the servo pressure is reduced from information of the pressure sensor 74 (S136). When the reduction of the servo pressure is not confirmed (not reduced) (S136: No), the ON malfunction of the pressure decrease valve 41 is determined (S137), and the abnormal flag is stored in a stand-up manner. This determination can be referred to FIG. 9B. In addition, when the reduction of the servo pressure is confirmed (S136: Yes), it is determined that other abnormalities are possible (S138), and the abnormal flag is stored in a stand-up manner.

Meanwhile, after a predetermined time elapses after the decompression instruction (S125), when the servo is nearly 0 (S126: Yes), it is determined that the pressure decrease valve 41, the pressure increase valve 42 and the system are normal (S139). FIG. 9A relates to the ON malfunction of the pressure increase valve 42, and FIG. 9B relates to the ON malfunction of the pressure decrease valve 41.

Figure 10:
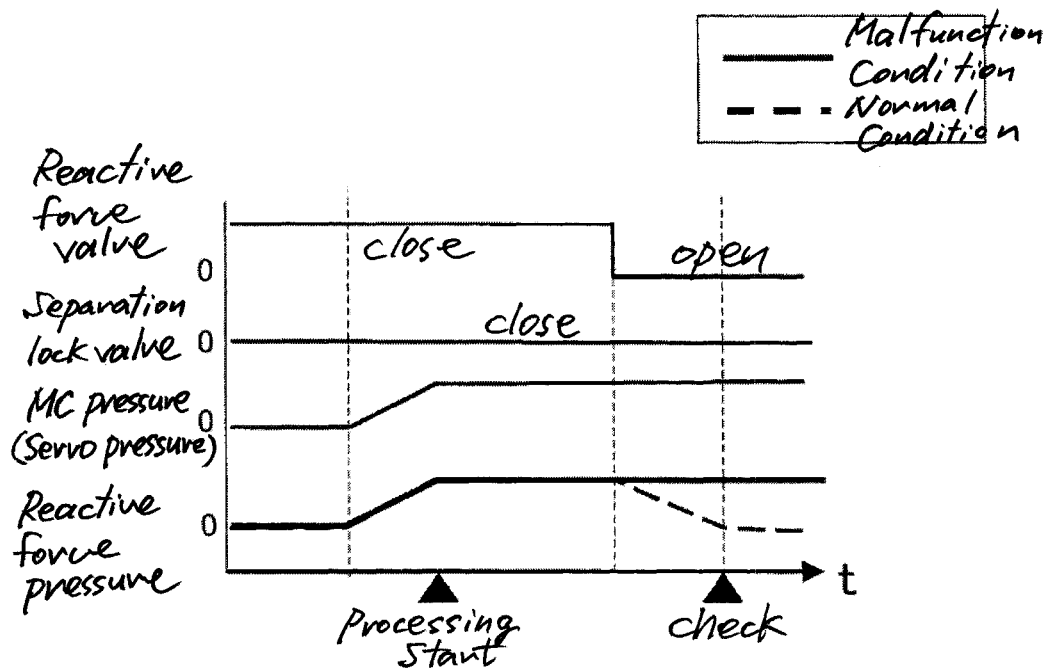
FIG. 10 is an explanatory diagram that illustrates a flow of processing related to the abnormality detection control.

Finally, completion processing of setting the respective electromagnetic valves 22, 3, 41 and 42 the OFF state (the non-electricity state) is performed (S140), and the abnormality check is finished. In addition, for reference, the determination of the ON malfunction (fixed in the ON state, that is, in the closed state) of the reactive force valve 3 can be referred to FIG. 10.

In addition, in the case of the simple check mode (S101: Yes), firstly, it is checked whether or not there is a braking demand (S201). For example, when the brake pedal 10 is stepped and there is a braking demand (S201: No), the process returns to S101 again. When there is no braking demand (S201: Yes), it is checked whether or not the mode is a short time mode (S202). The short time mode is a mode in which a case of an STPON startup and an ICON startup corresponds to the startup timing of the brake ECU 6. The STPON startup is a startup when stepping and starting the brake pedal 10. The ICON startup is a startup when turning and starting the ignition ON. When the startups are performed just before the determination (S202), it is determined that there is no time when the brake pedal 10 is stepped (S202: Yes), and the abnormal flag stored in the memory means or the like is checked (S203).

When the abnormal flag does not stand up (S203: No), the completion processing is performed (S140). When the abnormal flag stands up (S203: Yes), other portions are normal, and only the portion in which an abnormal flag stands up is checked by the same flow as mentioned above (S204). When there is abnormality, the abnormality is stored. After that, the completion processing such as the servo pressure decompression and the electromagnetic valve OFF is performed (S140). In addition, when abnormality is detected, abnormality is notified to a driver by notifying means such as a lamp.

According to the present embodiment, as in S116, when the brake pedal 10 is in a non-operation state, the servo pressure is automatically pressed by the servo pressure generator 4, and the failure of the master system can be detected, based on the servo pressure and the reactive force pressure (the brake fluid consumption correlative value) at that time. Furthermore, similarly, when the brake pedal 10 is in a non-operation state, the servo pressure is automatically pressed by the servo pressure generator 4, and the failure of the regulator 44 can be detected, based on the servo pressure and the reactive force pressure (the brake fluid consumption correlative value) at that time.

<Modified Form of Abnormality Detection Control>

Figure 3A:
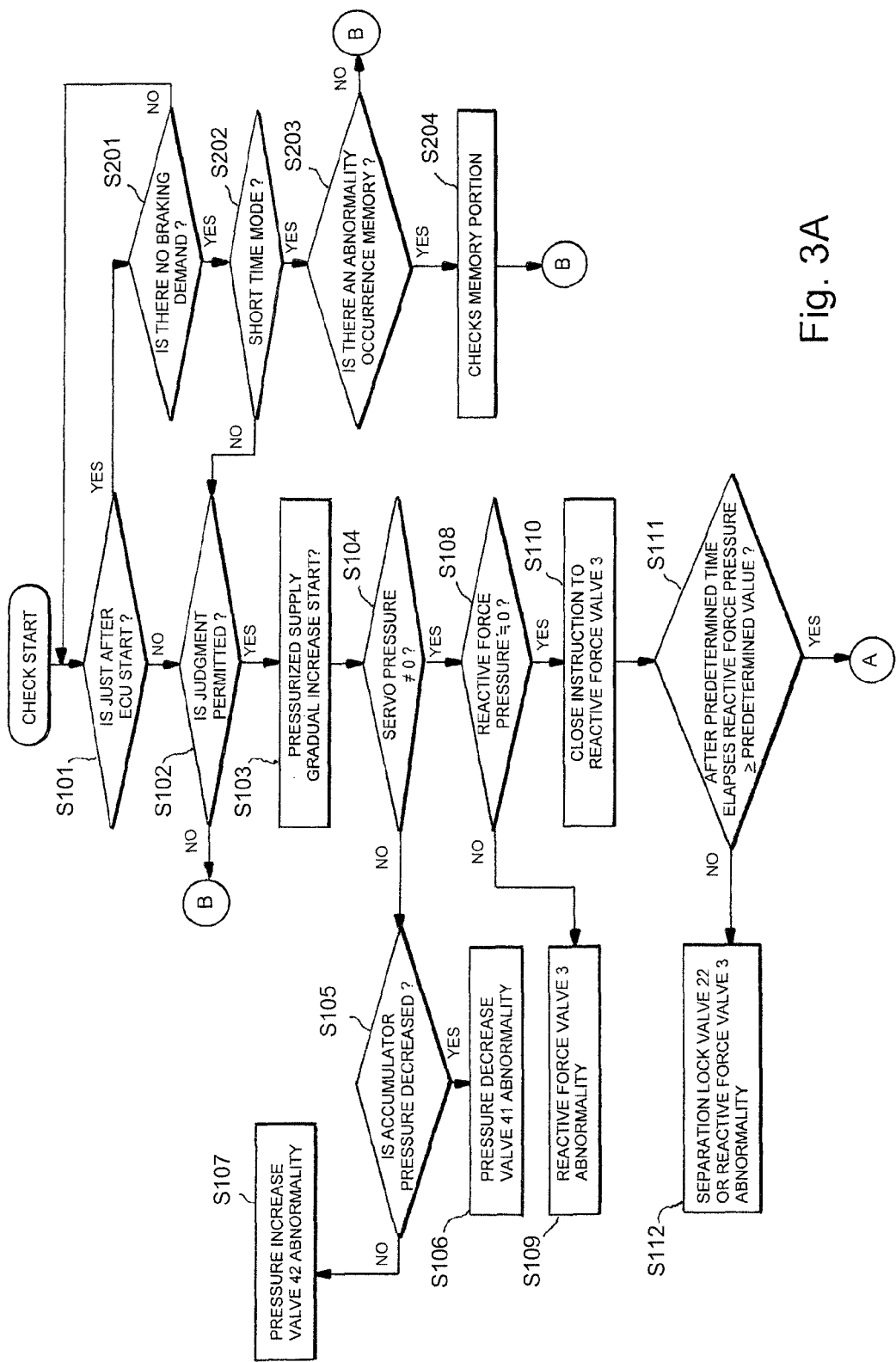
FIG. 3A is a first part of a flow chart and FIG. 3B is a second part of the flow chart related to an abnormality detection control of the present embodiment.
Figure 3B:
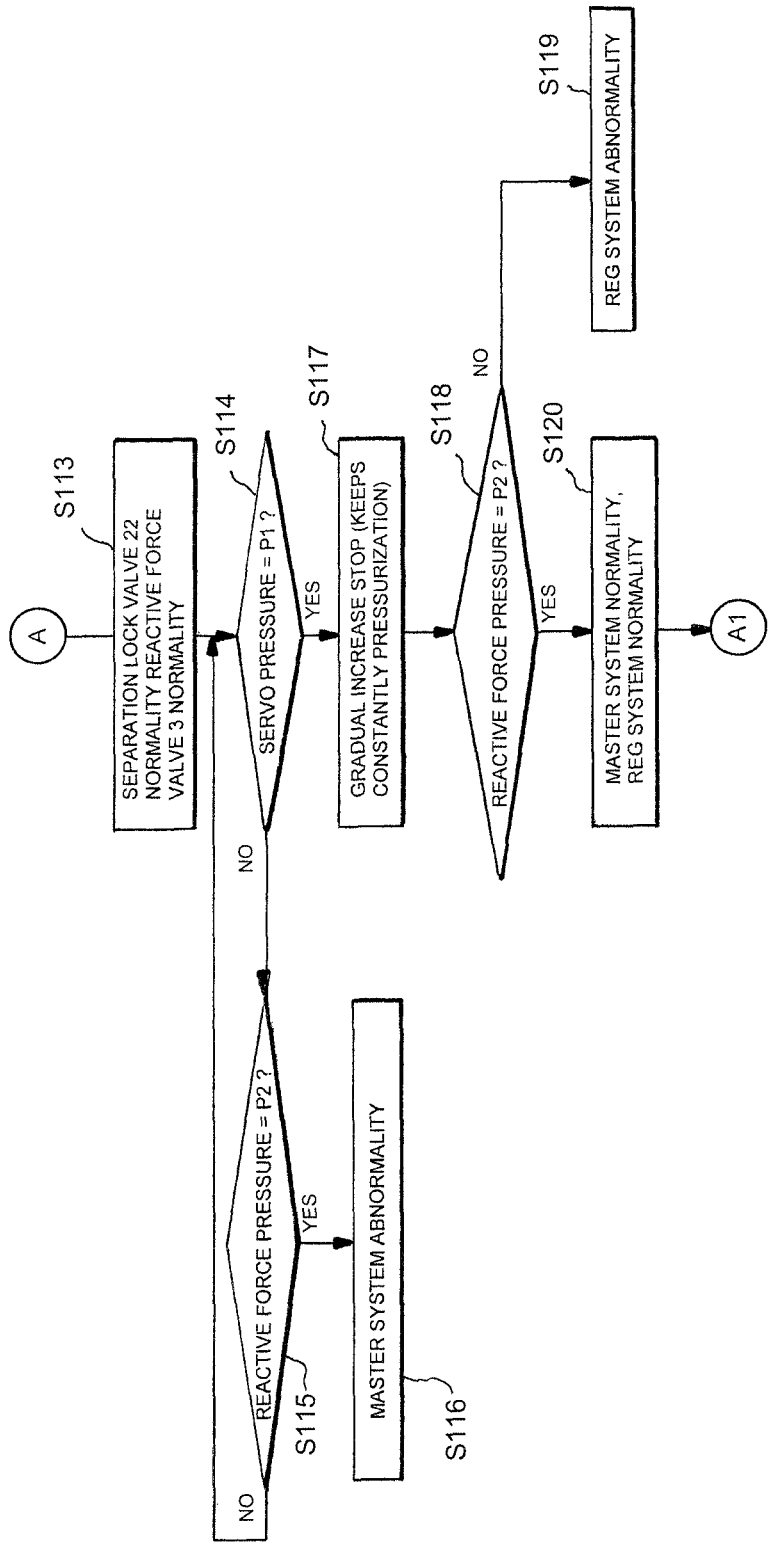
Figure 11:
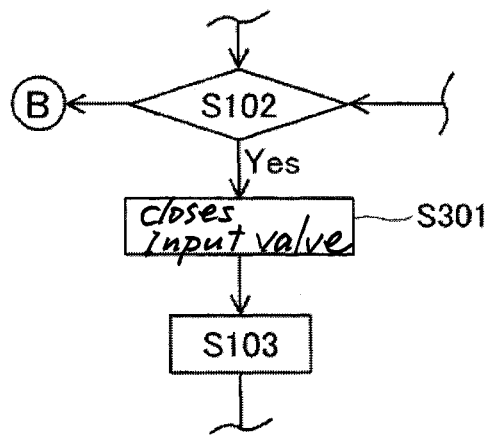
FIG. 11 is a flow chart related to an abnormality detection control of a modified form of the present embodiment.

Herein, as illustrated in FIG. 11, between S102 and S103 shown in FIG. 3, an input valve closing step S301 may be provided which gives the entire holding valve 531 serving as the input valve of the ABS 53 to close instruction. Thereby, it is possible to reliably separate that the detected abnormality is due to abnormality of the master system or due to the oil leakage in the downstream of the ABS 53. It is possible to reliably determine that abnormality detected in S116 is abnormality of the master system, by setting the entire holding valve 531 to the closed state. For example, it is possible to separate abnormality from the oil leakage of the wheel cylinders 541 to 544.

Figure 12:
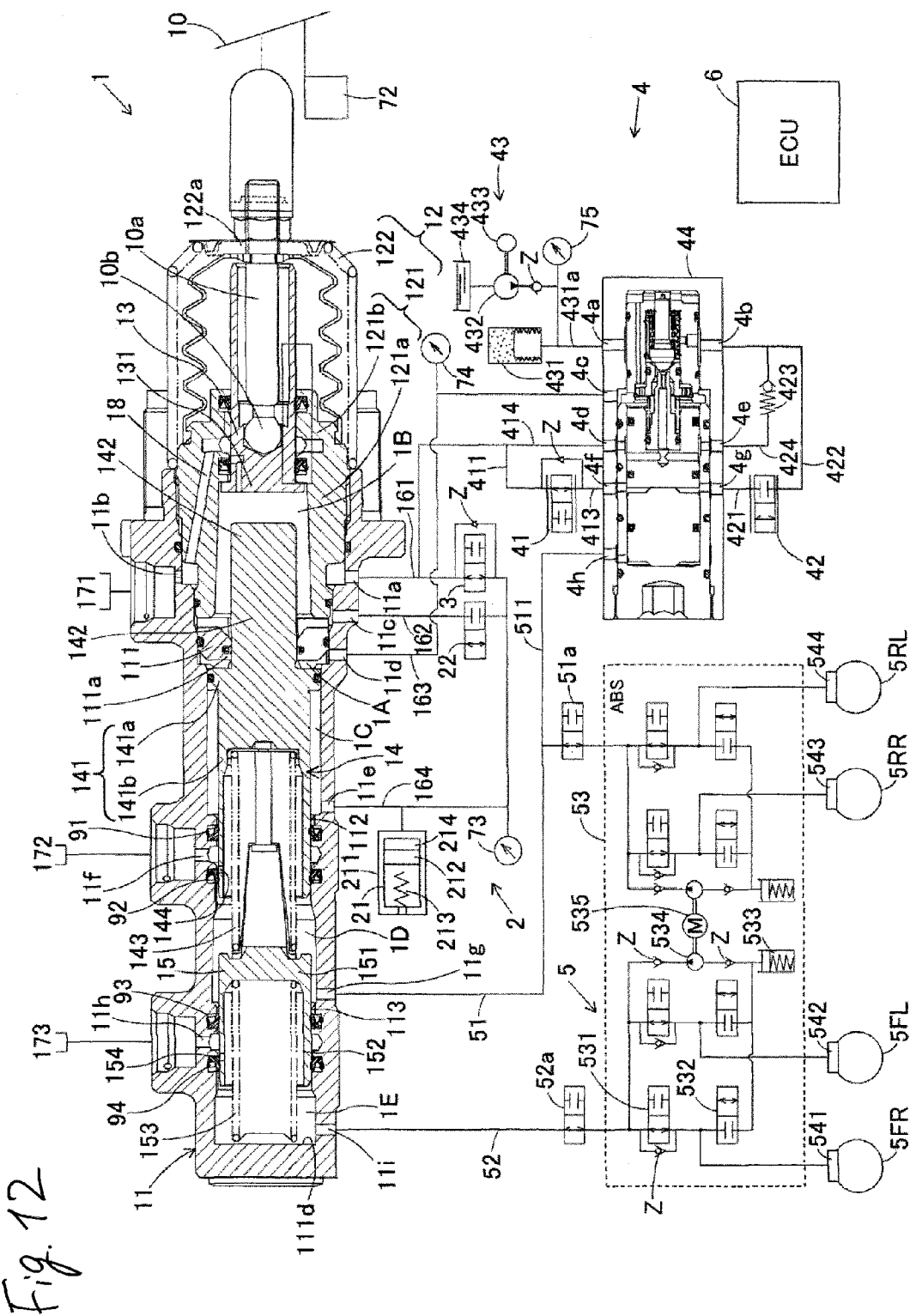
FIG. 12 is a partially cross-sectional explanatory diagram that illustrates a configuration of a vehicle brake device of a modified form of the present embodiment.

Otherwise, as illustrated in FIG. 12, switching valves 51a and 52a serving as a usually-opened type electromagnetic valve may be provided on the pipes 51 and 52. However, the switching valve 51a is provided at a downstream side (ABS 53 side) of the connection portion with the pipe 511. Thereby, the same effect is exhibited by setting the switching valves 51a and 52a but not the holding valve 531 to the closed state in the input valve close step. The switching valves 51a and 52a may be valve devices capable of controlling the opening and closing, and are not limited to the usually-opened type and the electromagnetic valve.

Furthermore, abnormality (the OFF malfunction of the separation lock valve 22 or the OFF malfunction of the reactive force valve 3) detected in S112 can be separated from each other by the following methods. When the abnormal flag stands up in S112, a notification means notifies abnormality and notifies a driver to step the brake pedal 10 (for example, turns off but not turns on an abnormality lamp). When a driver steps the brake pedal 10 according to the notification and the reactive force pressure does not rise at that time, it is understood that there is an OFF malfunction (fixed in the OFF state, that is, in the opened state) in which the reactive force valve 3 is not in a closed state. When the reactive force valve 3 is in the opened state, since the second reactive force chamber 1C communicates with the reservoir 171, the reactive force pressure does not rise. On the contrary, in an opposite case, it is possible to determine the OFF malfunction of the separation lock valve 22.

Furthermore, abnormality (the ON malfunction of the pressure decrease valve 41 or the ON malfunction of the pressure increase valve 42) detected in S127 can be separated from each other by the following methods. After abnormality is detected in S127, in an open instruction state of the pressure decrease valve 41 and a close instruction state of the pressure increase valve 42, the close instruction is given to the pressure decrease valve 41 (see upper stage of FIG. 9). Thereby, if the servo pressure rises, the pressure decrease valve 41 enters the normally closed sate, it is understood that the pressure increase valve 42 is in the open state in spite of the close instruction, and thus it is possible to determine the ON malfunction of the pressure increase valve 42. In addition, when S126g is Yes, the process may be set so that S128 to S135 are skipped, and the completion processing (S137) is performed. Thereby, it is possible to perform the exhaustive abnormality check in a short time without pressing again.

Furthermore, the pressure decrease valve 41, the reactive force valve 3, the pressure adjustment portion 43, and the ABS 53 are suitably provided with the check valves z. The configuration of the ABS 53 is not limited to the above-mentioned configuration. For example, at the downstream side (the wheel cylinder side) of the holding valve 531, an actuator (not illustrated) capable of performing an increase and decompression control of the master cylinder pressure relative to the wheel cylinder may be provided. The actuator has, for example, a cylinder and a piston, and the piston is controlled by the brake ECU 6.

Figure 13:
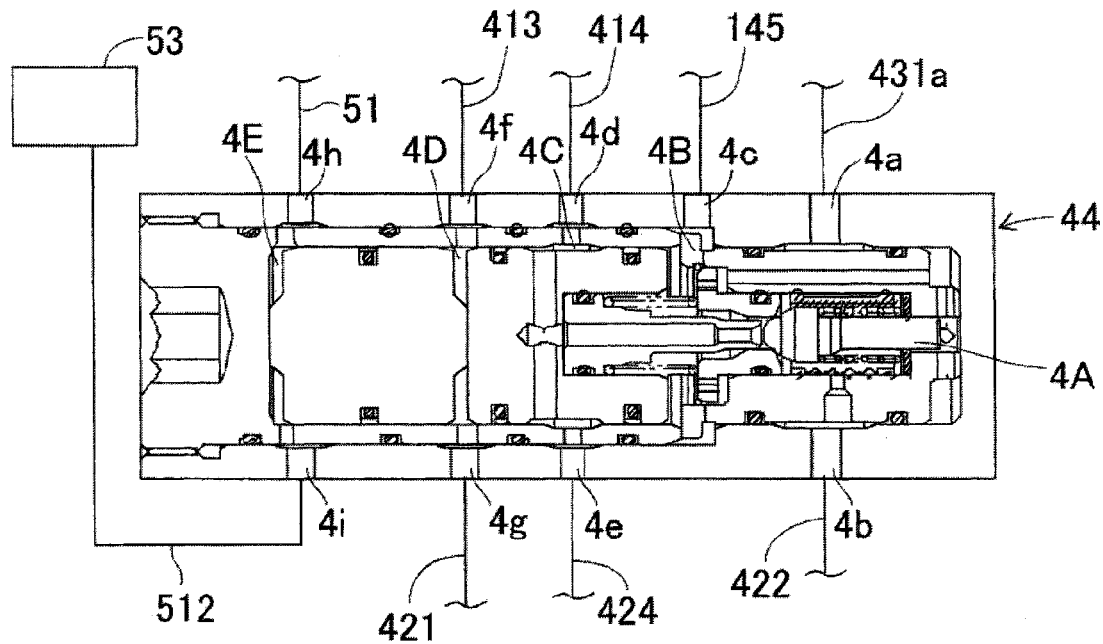
FIG. 13 is a configuration diagram that illustrates a modified form of a regulator of the present embodiment.

Furthermore, as illustrated in FIG. 13, the regulator 44 may have a configuration in which the port 4i connected to the fourth chamber 4E is formed at a position corresponding to the port 4h, and the port 4i and the ABS 53 (the holding valve 531) are connected by the pipe 512. The pipe 511 is removed, and the pipe 51 connects the port 134 with the port 4h.

Figure 14:
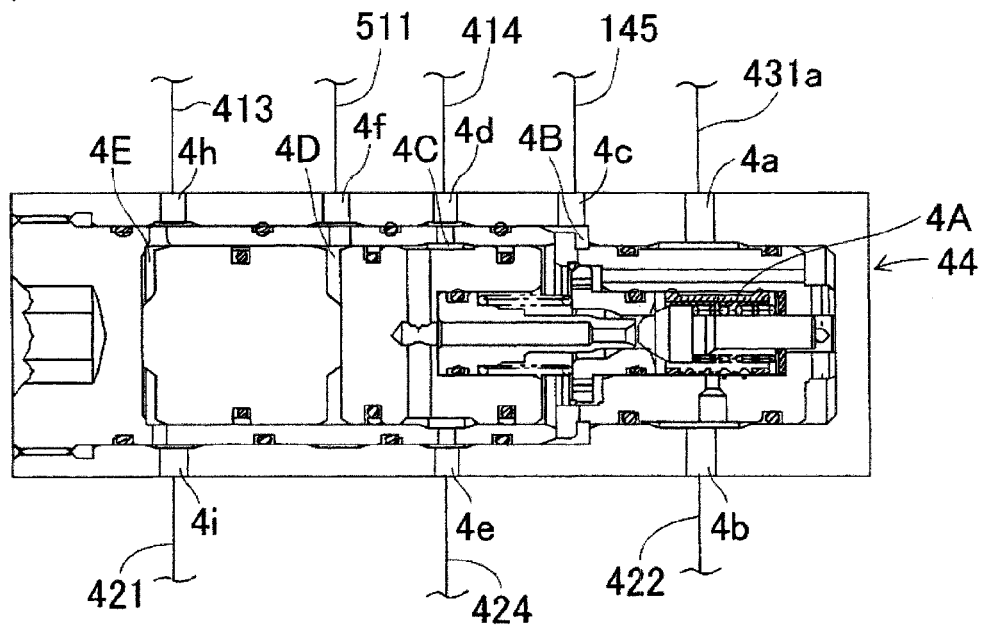
FIG. 14 is a configuration diagram that illustrates a modified form of a regulator of the present embodiment.

Furthermore, as illustrated in FIG. 14, the port 4g is blocked (or is connected to the ABS 53), and the pipe 511 (or the pipe 51) is connected to the port 4f. Moreover, the port 4h is connected to the pressure decrease valve 41 via the pipe 413, and the port 4i is connected to the pressure increase valve 42 via the pipe 421. According to this configuration, in the REG mode, the master piston pressure is added to the pressure control chamber 4D, thereby to cause the control piston 445 to slide on the cylinder bottom surface side. That is, the pressure control chamber 4D serves as the fourth chamber 4E of the present embodiment. Moreover, the pressure of the fourth chamber 4E in this configuration is controlled by the respective electromagnetic valves 41 and 42 in the linear mode, and when being pressed, the fourth chamber 4E causes the sub piston 446 and the control piston 445 to slide on the cylinder bottom surface side. That is, the role is replaced by the fourth chamber 4E and the pressure control chamber 4D.

As mentioned above, the regulator 44 in the present invention includes at least the first chamber 4A that is partitioned in the cylinder 441 and communicates with the accumulation portion 431, a second chamber 4B that is partitioned in the cylinder 441 and communicates with the servo chamber 1A, the pressure control chamber 4D that is partitioned in the cylinder 441 and communicates with the pressure increase valve 42 and the pressure decrease valve 41, and a pressure-receiving chamber (the fourth chamber 4E) that is partitioned in the cylinder 441 and communicates with the fluid pressure chamber 1D. Moreover, the regulator 44 may include the pistons 445 or 445 and 446 that advance according to the pressure boosting of the pressure control chamber 4D or the pressure boosting of the pressure-receiving chamber 4E, and the valve portions 442, 443 and 444 that cause the first chamber 4A and the second chamber 4B to communicate with each other by the advancement of the pistons. Furthermore, an operation force sensor may be included instead of the stroke sensor 72, and the operation force (leg-force) of the brake pedal 10 may be used instead of the stroke amount in the control, or both of them may be jointly used.

Furthermore, it may be said that the vehicle brake device of the present embodiment includes the first reactive force chamber 1B which is partitioned by the inner peripheral surface of the master cylinder and the back outer peripheral surface of the master piston, and a volume of which increases along with the advancement of the master piston; the second reactive force chamber 1C which is separated from the first reactive force chamber by the inner peripheral surface of the master cylinder and the back outer peripheral surface of the master piston, and a volume of which decreases along with the advancement of the master piston; and communication means 22 through which the first reactive force chamber and the second reactive force chamber communicate with each other, and the failure detection means 6 detects the failure of the master system based on the servo pressure and the reactive force pressure as the brake fluid consumption correlative value. In this case, even when the reactive force pressure is generated in the first reactive force chamber and the second reactive force chamber, the reactive force pressure acts on both outer peripheral surfaces of the back outer peripheral surface and the front outer peripheral surface of the master piston, and the master piston is driven by the servo pressure. Thus, a relationship between the servo pressure and the reactive force pressure is simple. Thus, it is possible to accurately detect the failure of the master system by the simple configuration based on the servo pressure and the reactive force pressure. In addition, it may be said that the vehicle brake device includes the fluid pressure chambers 1D and 1E which are formed in the master cylinder separately from the first reactive force chamber and the second reactive force chamber, and a volume of which decreases along with the advancement of the master piston regardless of the operation of the input piston; and adjustment supply means 53 that is placed between the fluid pressure chamber and the wheel cylinder, is configured to be able to adjust the brake fluid supplied from the fluid pressure chamber, and supplies the adjusted brake fluid to the wheel cylinder.

What is claimed is:

1. A vehicle brake device in which master piston is driven by any one of a force corresponding to an operation force of a brake operation member and a force corresponding to a servo pressure in a servo chamber to generate a master cylinder pressure, the device comprising:
    a pressure accumulation portion that accumulates the brake fluid under pressure;
    a servo pressure generation portion that is configured to be able to generate the servo pressure using the brake fluid in the pressure accumulation portion regardless of the operation of the brake operation member;
    brake fluid consumption correlative value detection means for detecting a brake fluid consumption correlative value which always correlates with a consumption of the brake fluid in the pressure accumulation portion; and
    failure detection means for driving the master piston only by the servo pressure using the servo pressure generation portion in a state where the brake operation member is not operated, and detecting a failure of a master system caused by brake fluid leakage from the master system, based on a brake fluid consumption correlative value detected by the brake fluid consumption correlative value detection means at that time.

2. The vehicle brake device according to claim 1, further comprising:
    a verification chamber, a volume of which is decreased along with advancement of the master piston,
    wherein the failure detection means detects the failure of the master system, based on the servo pressure and the pressure of the verification chamber as the brake fluid consumption correlative value.

3. The vehicle brake device according to claim 1, further comprising:
    fluid pressure chambers, a volume of which is reduced along with advancement of the master piston, and which generates the master cylinder pressure; and
    adjustment supply means that is placed between the fluid pressure chamber and the wheel cylinder, is configured to able to adjust the brake liquid supplied from the liquid pressure chamber, and supplies the adjusted brake liquid to the wheel cylinder,
    wherein the failure detection means performs the failure detection of the master system, after closing an input valve that is provided at an input side of the adjustment supply means.

4. The vehicle brake device according to claim 1, further comprising:
    fluid pressure chambers, a volume of which is reduced along with advancement of the master piston, and which generates the master cylinder pressure;
    adjustment supply means that is placed between the fluid pressure chamber and the wheel cylinder, is configured to able to adjust the brake liquid supplied from the fluid pressure chamber, and supplies the adjusted brake liquid to the wheel cylinder; and
    switching valves that are placed between the fluid pressure chamber and the adjustment supply means to connect/disconnect the fluid pressure chamber and the adjustment supply means,
    wherein the failure detection means performs the failure detection of the master system after closing the switching valves.

5. The vehicle brake device according to claim 2, further comprising:
    fluid pressure chambers, a volume of which is reduced along with advancement of the master piston, and which generates the master cylinder pressure; and
    adjustment supply means that is placed between the fluid pressure chamber and the wheel cylinder, is configured to able to adjust the brake liquid supplied from the liquid pressure chamber, and supplies the adjusted brake liquid to the wheel cylinder,
    wherein the failure detection means performs the failure detection of the master system, after closing an input valve that is provided at an input side of the adjustment supply means.

6. The vehicle brake device according to claim 2, further comprising:
    fluid pressure chambers, a volume of which is reduced along with advancement of the master piston, and which generates the master cylinder pressure;
    adjustment supply means that is placed between the fluid pressure chamber and the wheel cylinder, is configured to able to adjust the brake liquid supplied from the fluid pressure chamber, and supplies the adjusted brake liquid to the wheel cylinder; and
    switching valves that are placed between the fluid pressure chamber and the adjustment supply means to connect/disconnect the fluid pressure chamber and the adjustment supply means,
    wherein the failure detection means performs the failure detection of the master system after closing the switching valves.

* * * * *